(12) United States Patent
Futaki et al.

(10) Patent No.: US 10,172,083 B2
(45) Date of Patent: Jan. 1, 2019

(54) RADIO COMMUNICATION SYSTEM, RADIO STATION, RADIO TERMINAL, COMMUNICATION CONTROL METHOD, AND NON-TRANSITORY COMPUTER READABLE MEDIUM

(71) Applicant: NEC Corporation, Tokyo (JP)

(72) Inventors: Hisashi Futaki, Tokyo (JP); Hiroaki Aminaka, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 14/768,088

(22) PCT Filed: Dec. 3, 2013

(86) PCT No.: PCT/JP2013/007094
§ 371 (c)(1),
(2) Date: Aug. 14, 2015

(87) PCT Pub. No.: WO2014/128805
PCT Pub. Date: Aug. 28, 2014

(65) Prior Publication Data
US 2016/0007284 A1    Jan. 7, 2016

(30) Foreign Application Priority Data
Feb. 22, 2013 (JP) .................................. 2013-033703

(51) Int. Cl.
*H04W 76/15*  (2018.01)
*H04W 52/02*  (2009.01)
(Continued)

(52) U.S. Cl.
CPC ....... *H04W 52/0216* (2013.01); *H04L 1/0045* (2013.01); *H04L 5/001* (2013.01);
(Continued)

(58) Field of Classification Search
None
See application file for complete search history.

(56) References Cited

U.S. PATENT DOCUMENTS

2011/0292851 A1\* 12/2011 Fong ...................... H04L 5/001
                                                                     370/311
2012/0176926 A1    7/2012 Jang et al.
(Continued)

FOREIGN PATENT DOCUMENTS

CN       102123447 A     7/2011
CN       102714877 A    10/2012
(Continued)

OTHER PUBLICATIONS

Korean Office Action issued by the Korean Intellectual Property Office for Application No. 2015-7022109 dated Jul. 6, 2016 (10 pages).

(Continued)

*Primary Examiner* — Ayanah S George
(74) *Attorney, Agent, or Firm* — Wilmer Cutler Pickering Hale and Dorr LLP

(57) ABSTRACT

A radio terminal (3) can perform carrier aggregation using a first cell (10) of a first radio station (1) and a second cell (20) of a second radio station (2). The first radio station (1) or the second radio station (2) transmits constraint information to the radio terminal (3). The constraint information contains an information element necessary to specify a reception constraint and/or transmission constraint related to the first cell (10) and/or the second cell (20) when the carrier aggregation is performed. The reception/transmission constraint is a constraint related to downlink signal reception/ uplink signal transmission by the radio terminal over one or more subframe periods of the primary cell (10) and the secondary cell (20). It is thus, for example, possible to contribute to reduction in wasteful power consumption in (Continued)

the radio terminal in the carrier aggregation of a plurality of cells served by different radio stations.

33 Claims, 17 Drawing Sheets

(51) Int. Cl.
*H04W 48/00* (2009.01)
*H04W 48/12* (2009.01)
*H04L 5/00* (2006.01)
*H04W 72/04* (2009.01)
*H04L 1/00* (2006.01)

(52) U.S. Cl.
CPC .......... *H04L 5/0035* (2013.01); *H04L 5/0098* (2013.01); *H04W 48/00* (2013.01); *H04W 48/12* (2013.01); *H04W 52/0229* (2013.01); *H04W 72/042* (2013.01); *Y02D 70/00* (2018.01); *Y02D 70/1222* (2018.01); *Y02D 70/1242* (2018.01); *Y02D 70/1262* (2018.01); *Y02D 70/146* (2018.01); *Y02D 70/23* (2018.01); *Y02D 70/24* (2018.01); *Y02D 70/25* (2018.01)

(56) References Cited

U.S. PATENT DOCUMENTS

| | | | | |
|---|---|---|---|---|
| 2012/0327797 | A1* | 12/2012 | Siomina | H04W 36/30 370/252 |
| 2014/0185467 | A1* | 7/2014 | Heo | H04W 52/54 370/252 |
| 2016/0192268 | A1 | 6/2016 | Takeda et al. | |

FOREIGN PATENT DOCUMENTS

| | | |
|---|---|---|
| EP | 2451239 A1 | 5/2012 |
| JP | 2012-070394 A | 4/2012 |
| JP | 2012-520626 A | 9/2012 |
| JP | 2012-530406 A | 11/2012 |
| JP | 2014-120940 A | 6/2014 |
| KR | 10-2011-0028354 A | 3/2011 |
| KR | 10-2012-0016014 A | 2/2012 |
| KR | 10-2012-0113678 A | 10/2012 |
| WO | WO-2010/147967 A2 | 12/2010 |
| WO | WO-2012/138142 A2 | 10/2012 |

OTHER PUBLICATIONS

International Search Report corresponding to PCT/JP2013/007094 dated Jan. 14, 2014 (2 pages).
3GPP TS 36.300 V11.3.0, "Evolved Universal Terrestrial Radio Access (E-UTRA) and Evolved Universal Terrestrial Radio Access Network (E-UTRAN); Overall description; Stage 2 (Release 11)", Section 7.5, (Sep. 2012) (pp. 1-205).
3GPP TS 36.321 V11.0.0, "Evolved Universal Terrestrial Radio Access (E-UTRA); Medium Access Control (MAC) protocol specification (Release 11)", Section 6.1.3.8, (Sep. 2012) (55 pages).
3GPP RWS-120046, Samsung Electronics, "Technologies for Rel-12 and Onwards", 3GPP TSG RAN Workshop on Rel-12 and Onwards, Ljubljana, Slovenia (Jun. 11-12, 2012) (32 Pages).
3GPP RWS-120010, NTT DOCOMO, "Requirements, Candidate Solutions & Technology Roadmap for LTE Rel-12 Onward", 3GPP TSG RAN Workshop on Rel-12 and Onwards, Ljubljana, Slovenia (Jun. 11-12, 2012) (pp. 1-27).
ITRI, Discussion of DRX in Carrier Aggregation, 3 GPP TSG-RAN WG2 Meeting #66bis R2-093915, (Jul. 3, 2009), p. 1-p. 4 (http://www.3gpp.org/ftp/TSG_RAN/WG2_RL2/TSGR2_66bis/Docs/R2-093915.zip) (pp. 1-4).
NTT DOCOMO, Enhanced Cell Identification for Additional Carrier Type, 3GPP TSG RAN WG1 Meeting #68 R1-120398, Feb. 10, 2012, p. 1-p. 4 (http://www.3gpp.org/ftp/TSG_RAN/WG1_RL1/TSGR1_68/Docs/R1-120398.zip) (Feb. 2, 2012) (pp. 1-4).
Korean Notice of Preliminary Rejection issued in corresponding Korean Patent Application No. 10-2017-7000327, dated Apr. 3, 2017. 8 pages.
Extended European Search Report issued in corresponding European Patent Application No. 13875464.3, dated Oct. 10, 2016, 10 pages.
Nokia Siemens Networks "Carrier Based ICIC for Inter-eNB PCell/SCell Optimization", 3GPP TSG-RAN WG3 Meeting #75-Bis, R3-120602, San Jose del Cabo, Mexico, Mar. 26-30, 2012, 4 pages.
Extended European Search Report issued by the European Patent Office for European Application No. 17167476.5 dated Jul. 12, 2017 (9 pages).
Fujitsu, "Discussion of Issues in Small Cell Deployments," 3GPP TSG-RAN WG2 Meeting #81, R2-130513, Agenda Item: 7.2 (Small Cell Enhancements—Higher Layer), St. Julian's Malta, Jan. 28-Feb. 1, 2013 (5 pages).
Renesas Mobile Europe, "Discussion about dual connectivity," 3GPP TSG-RAN WG2 Meeting #81, R2-130657, Agenda Item: 7.2, Malta, Jan. 28-Feb. 1, 2013 (6 pages).
Ericsson, ST-Ericsson "Impact of HSPA Multiflow on BS and UE RF Requirements", 3GPP TSG-RAN WG4#63, R4-122683, Prague, CR May 21-26, 2012, pp. 1-9 (9 sheets).
Japan Notification of Reasons for Refusal issued in Japanese Patent Application No. 2015-501092, dated Jan. 30, 2018, 7 pages.
Chinese Office Action issued by the State Intellectual Property Office of the People's Republic of China for Chinese Application No. 201380073742.0 dated Feb. 28, 2018 (18 pages).
First Office Action issued by The State Intellectual Property Office of People's Republic of China for Chinese Application No. 201610090315.9 dated Jul. 23, 2018 (20 pages).

\* cited by examiner

RADIO COMMUNICATION SYSTEM, RADIO STATION, RADIO TERMINAL, COMMUNICATION CONTROL METHOD, AND NON-TRANSITORY COMPUTER READABLE MEDIUM

CROSS-REFERENCE TO RELATED APPLICATIONS

This application is a national stage application of International Application No. PCT/JP2013/007094 entitled "Radio Communication System, Radio Station, Radio Terminal, Communication Control Method, and Non-Transitory Computer Readable Medium" filed on Dec. 3, 2013, which claims priority to Japanese Application No. 2013-033703 filed on Feb. 22, 2013, the disclosures of which are hereby incorporated by reference in their entirety.

TECHNICAL FIELD

The present invention relates to a radio communication system in which a radio station communicates with a radio terminal by using a plurality of cells.

BACKGROUND ART

In order to improve the deterioration of communication quality due to drastic increases in mobile traffic in recent years and achieve faster communication, the standardization of Carrier Aggregation (CA) functions that enable a radio terminal (User Equipment (UE)) to communicate with a radio base station (eNode B (eNB)) by using a plurality of cells has been undertaken in the 3GPP Long Term Evolution (LTE). Note that the cells that a UE (User Equipment) can use in CA are limited to a plurality of cells of one eNB (i.e., a plurality of cells served by one eNB).

The cells that are used by a UE in CA are categorized into a Primary Cell (PCell) that has already been used as a serving cell when the CA is started and a Secondary Cell(s) (SCell(s)) that is used in addition to the PCell or in dependence thereon. Each SCell can be used by a UE as the need arises, and the use of them can be stopped. Note that starting the use of an SCell is called "activating" or "activation". Similarly, stopping the use of an SCell is called "deactivating" or "deactivation". Non-Access Stratum (NAS) mobility information, security information (security input) and the like are transmitted and received through a PCell during radio connection (re)-establishment (RRC connection Establishment/Re-establishment) (see Non-patent Literature 1). A downlink (DL) Carrier and an uplink (UL) Carrier corresponding to a PCell are called "DL Primary Component Carrier (PCC)" and "UL PCC", respectively. Similarly, a DL Carrier and a UL Carrier corresponding to a SCell are called "DL Secondary Component Carrier (SCC)" and "UL SCC", respectively.

A downlink data (DL data) transmission operation in CA is explained with reference to FIG. 17 (Non-patent Literature 2). Here, it is assumed that a UE uses a first cell (Cell1) and a second cell (Cell2) served by an eNB as a PCell and an SCell, respectively. In a step S1, the eNB transmits, to the UE, configuration information for the SCell (i.e., the Cell2) (RRC Connection Reconfiguration (SCell configuration)). In a step S2, the eNB transmits to the UE an instruction indicating the activation of the Cell2 (Activation control element (activation of SCell)). In a step S3, the UE starts to use the SCell (SCell activation). In steps S4 and S5, the eNB transmits DL data to the UE by using the PCell and the SCell.

In a step S6, the eNB determines that it no longer needs to use the SCell for the UE and hence transmits an instruction indicating the deactivation of the SCell (Deactivation control element (deactivation of SCell)). In a step S7, the UE suspends the use of the Cell2 (SCell deactivation). In a step S8, the eNB and the UE transmit/receive DL data by using only the PCell.

In a step S9, the eNB determines that it needs to use the SCell for the UE again and hence transmits an instruction indicating the activation of the SCell (Activation control element (activation of SCell)). In a step S10, the UE starts to use the SCell (SCell activation). In steps S11 and S12, the eNB transmits DL data to the UE by using the PCell and the SCell.

As explained above, the eNB can control whether the SCell should be used (activated) or not according to the data amount (also called "traffic amount") regarding the UE. This makes it possible to improve the throughput for each UE while avoiding the increase in the power consumption which would be otherwise caused by the unnecessary decoding of DL control signals (Physical Downlink Control Channel: PDCCH) performed by the UE.

CITATION LIST

Non Patent Literature

Non-patent Literature 1: 3GPP TS 36.300 V11.3.0, "Evolved Universal Terrestrial Radio Access (E-UTRA) and Evolved Universal Terrestrial Radio Access Network (E-UTRAN); Overall description; Stage 2 (Release 11)", Section 7.5, September 2012

Non-patent Literature 2: 3GPP TS 36.321 V11.0.0, "Evolved Universal Terrestrial Radio Access (E-UTRA); Medium Access Control (MAC) protocol specification (Release 11)", Section 6.1.3.8, September 2012

Non-patent Literature 3: 3GPP RWS-120046, Samsung Electronics, "Technologies for Rel-12 and Onwards", 3GPP TSG RAN Workshop on Rel-12 and Onwards, Ljubljana, Slovenia, 11-12 Jun. 2012

Non-patent Literature 4: 3GPP RWS-120010, NTT DOCOMO, "Requirements, Candidate Solutions & Technology Roadmap for LTE Rel-12 Onward", 3GPP TSG RAN Workshop on Rel-12 and Onwards, Ljubljana, Slovenia, 11-12 Jun. 2012

SUMMARY OF INVENTION

Technical Problem

Further, inter-base station carrier aggregation (inter-eNB CA) in which cells of different radio base stations (eNBs) are simultaneously used has been proposed (Non-patent Literatures 3 and 4). For example, a cell of a macro base station (Macro eNB (MeNB)) and a cell of a low-power base station (Low Power Node (LPN)) are simultaneously used as a PCell and an SCell, respectively. In inter-base station (or inter-eNB) carrier aggregation, bearers are independently configured in the PCell and the SCell and communication is performed between an UE and the MeNB and between the UE and the LPN.

For example, a radio terminal (UE) performs voice communication (called "Voice over IP (VoIP)" or "Voice over LTE (VoLTE)") in the P Cell and performs data communication (e.g., FTP) in the SCell. In general, VoIP communication is not performed often. Meanwhile, FTP traffic changes according to the user activities. In the case of the ordinary CA where cells of the same base station are used, the eNB can adaptively control the activation/deactivation of the SCell according to the FTP traffic. However, in the case where the PCell and the SCell are served by different eNBs, it is difficult for the eNB (e.g., an MeNB) that serves the PCell to adaptively control the activation/deactivation of the SCell served by the other eNB (e.g., an LPN) according to the FTP traffic provided in that SCell. Accordingly, for example, the UE has to unnecessarily decode a downlink control signal (PDCCH) in the SCell where communication is not performed often, thus causing a possibility that the electric power is wastefully consumed. This could cause a problem especially in the case where the resource scheduling of the PCell and that of the SCell are independently performed in different base stations. This is because when each radio base station independently performs scheduling, it is possibly difficult to use the PDCCH of the PCC for the scheduling of data transmission performed in the SCC (i.e., to perform the so-called cross-carrier scheduling).

Further, in the carrier aggregation, the SCell is activated on the precondition that the UE has an active connection with the PCell. In other words, the SCell is additionally or dependently activated on the condition that the UE is in connection with the PCell. Therefore, the UE cannot deactivate the PCell while maintaining the SCell in the activated state. For this reason, the UE has to maintain a state that the UE can receive or transmit on the PCell even when VoIP communication in the PCell is rarely performed.

One of the objects of the present invention is to provide a radio communication system, a radio station, a radio terminal (UE), a communication control method, and a program which are contribute to reduction in wasteful power consumption of a radio terminal (UE) in carrier aggregation of a plurality of cells served by different radio stations.

Solution to Problem

In a first aspect, a radio communication system includes a first radio station that serves a first cell, a second radio station that serves a second cell, and a radio terminal capable of performing carrier aggregation using the first and second cells. Further, the first or second radio station is configured to transmit constraint information to the radio terminal. The constraint information contains an information element necessary to specify at least one of a reception constraint and transmission constraint related to at least one of the first and second cells when the carrier aggregation is performed. The reception constraint is a constraint related to downlink signal reception by the radio terminal over one or more subframe periods of the first and second cells. The transmission constraint is a constraint related to uplink signal transmission by the radio terminal over the one or more subframe periods.

In a second aspect, a first radio station that serves a first cell includes a communication control unit. The communication control unit supports carrier aggregation using the first cell and a second cell served by a second radio station. Further, the communication control unit transmits constraint information to a radio terminal that performs the carrier aggregation. The constraint information contains an information element necessary to specify at least one of a reception constraint and transmission constraint related to at least one of the first and second cells when the carrier aggregation is performed. The reception constraint is a constraint related to downlink signal reception by the radio terminal over one or more subframe periods of the first and second cells. The transmission constraint is a constraint related to uplink signal transmission by the radio terminal over the one or more subframe periods.

In a third aspect, a second radio station that serves a second cell includes a communication control unit. The communication control unit supports carrier aggregation using a first cell served by a first radio station and the second cell. Further, the communication control unit transmits constraint information to a radio terminal that performs the carrier aggregation. The constraint information contains an information element necessary to specify at least one of a reception constraint and transmission constraint related to at least one of the first and second cells when the carrier aggregation is performed. The reception constraint is a constraint related to downlink signal reception by the radio terminal over one or more subframe periods of the first and second cells. The transmission constraint is a constraint related to uplink signal transmission by the radio terminal over the one or more subframe periods.

In a fourth aspect, a radio terminal includes a communication control unit that supports carrier aggregation using a first cell served by a first radio station as a first cell and using a second cell served by a second radio station as a second cell. Further, the communication control unit receives constraint information from the first or second radio station. The constraint information contains an information element necessary to specify at least one of a reception constraint and transmission constraint related to at least one of the first and second cells when the carrier aggregation is performed. The reception constraint is a constraint related to downlink signal reception by the radio terminal over one or more subframe periods of the first and second cells. The transmission constraint is a constraint related to uplink signal transmission by the radio terminal over the one or more subframe periods.

In a fifth aspect, a communication control method performed in a first radio station that serves a first cell includes transmitting constraint information to a radio terminal that performs carrier aggregation. The carrier aggregation uses the first cell and a second cell served by a second radio station. The constraint information contains an information element necessary to specify at least one of a reception constraint and transmission constraint related to at least one of the first and second cells when the carrier aggregation is performed. The reception constraint is a constraint related to downlink signal reception by the radio terminal over one or more subframe periods of the first and second cells. The transmission constraint is a constraint related to uplink signal transmission by the radio terminal over the one or more subframe periods.

In a sixth aspect, a communication control method performed in a second radio station that serves a second cell includes transmitting constraint information to a radio terminal that performs carrier aggregation. The carrier aggregation uses a first cell served by a first radio station and the second cell. The constraint information contains an information element necessary to specify at least one of a reception constraint and transmission constraint related to at least one of the first and second cells when the carrier aggregation is performed. The reception constraint is a constraint related to downlink signal reception by the radio terminal over one or more subframe periods of the first and second cells. The transmission constraint is a constraint related to uplink signal transmission by the radio terminal over the one or more subframe periods.

In a seventh aspect, a communication control method performed in a radio terminal includes performing carrier aggregation using a first cell served by a first radio station and a second cell served by a second radio station, and receiving constraint information from the first or second radio station. The constraint information contains an information element necessary to specify at least one of a reception constraint and transmission constraint related to at least one of the first and second cells when the carrier aggregation is performed. The reception constraint is a constraint related to downlink signal reception by the radio terminal over one or more subframe periods of the first and second cells. The transmission constraint is a constraint related to uplink signal transmission by the radio terminal over the one or more subframe periods.

In an eighth aspect, a program includes instructions for causing a computer to perform a communication control method according to the above-described fifth aspect.

In a ninth aspect, a program includes instructions for causing a computer to perform a communication control method according to the above-described seventh aspect.

In a tenth aspect, a program includes instructions for causing a computer to perform a communication control method according to the above-described seventh aspect.

Advantageous Effects of Invention

According to the above-described aspects, it is possible to provide a radio communication system, a radio station, a radio terminal (UE), a communication control method, and a program which are contribute to reduction in wasteful power consumption of a radio terminal (UE) in carrier aggregation of a plurality of cells served by different radio stations.

DESCRIPTION OF EMBODIMENTS

Specific embodiments are explained hereinafter in detail with reference to the drawings. The same symbols are assigned to the same or corresponding elements throughout the drawings, and duplicated explanations are omitted as necessary.

First Embodiment

Figure 1:
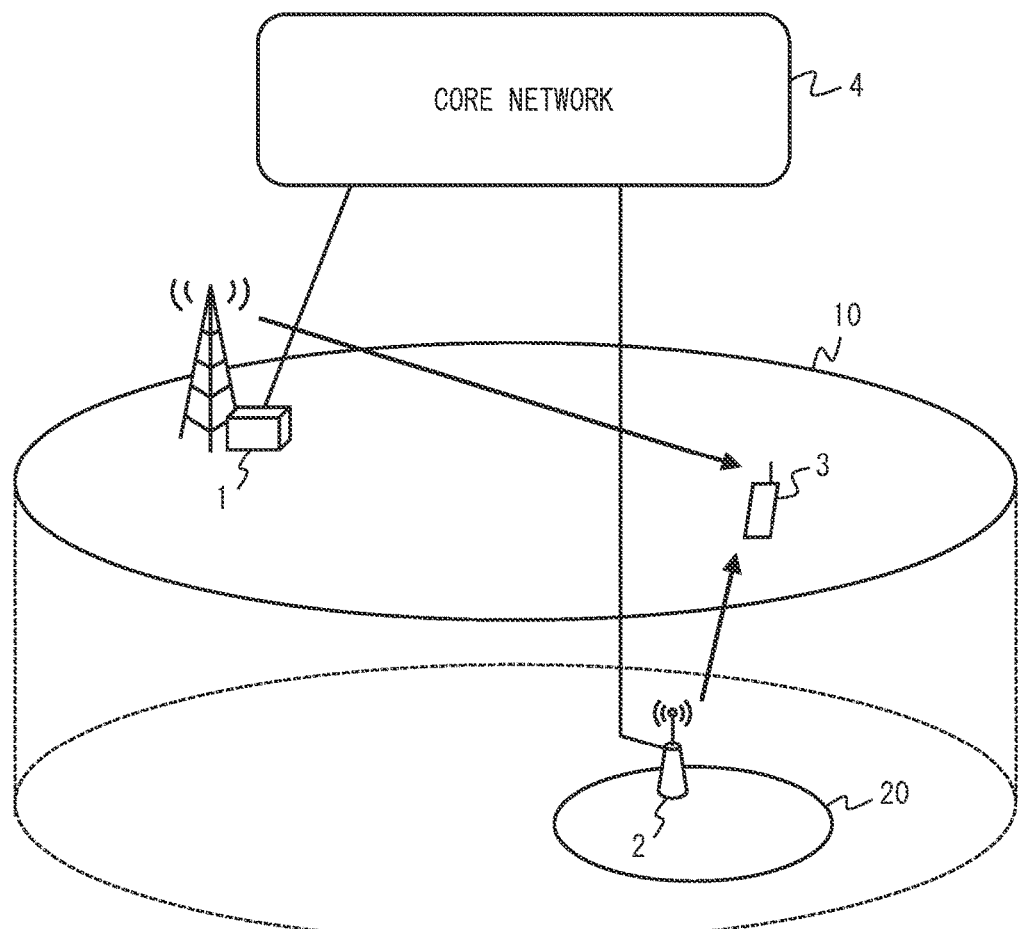
FIG. 1 shows a configuration example of a radio communication system according to a first embodiment.

FIG. 1 shows a configuration example of a radio communication system according to this embodiment. The radio communication system according to this embodiment includes a first radio station 1, a second radio station 2, and a radio terminal 3. The radio stations 1 and 2 are connected to a core network 4 and serve first and second cells 10 and 20, respectively. Each of the radio stations 1 and 2 is, for example, a radio base station, a base station control station, or a simplified radio base station having only some of the functions (protocol layers) of an ordinary radio base station. The radio terminal 3 has a function of, while using a cell of one radio base station, using a cell of another radio station. In other words, the radio terminal 3 supports a carrier aggregation (or cell aggregation) of a plurality of cells served by different radio stations. Note that the different radio stations may be different base stations independent of each other, or may be one radio station and another radio base station dependent on the one radio station. Further, the different radio stations may be radio stations of different types having different functions.

For example, the radio terminal 3 can establish a second radio connection on the second cell 20 while maintaining a first radio connection on the first cell 10. In this way, the radio terminal 3 can simultaneously use a plurality of cells (e.g., the cells 10 and 20) for transmitting or receiving signals (e.g., user data or control information). Note that, the expression "simultaneous use of a plurality of cells" is not limited to actual simultaneous reception or transmission of signals in a plurality of cells. That is, it includes: a state where the radio terminal actually receives or transmits signals in either one of the cells although the radio terminal is able to receive or transmit signals in both of the cells; a state where the radio terminal receives or transmits signals of different types in the respective cells; and a state where the radio terminal uses each of the plurality of cells for either signal reception or signal transmission.

In view of the carrier aggregation of a plurality of cells served by different radio stations, the function of using a plurality of cells served by different radio stations can be called "inter-radio station carrier aggregation". Further, in view of the above-described simultaneous use of a plurality of cells, the function of using a plurality of cells served by different radio stations can also be called "Dual Connection", "Dual Connectivity", "Multi Connection", "Multi Connectivity", or the like.

The radio terminal 3 may transmit to the radio station 1 or the radio station 2 a terminal capability report indicating that the radio terminal 3 is capable of performing inter-radio station carrier aggregation (i.e., supports inter-radio station carrier aggregation). Alternatively, the radio terminal 3 may implicitly indicate that the radio terminal 3 supports inter-radio station carrier aggregation by the category of the radio terminal 3 or its device release number. The capability of performing inter-radio station carrier aggregation can also be called "dual-connection capability" or "multi-connection capability".

FIG. 1 shows a Heterogeneous Network (HetNet) environment. Specifically, the first cell 10 shown in FIG. 1 has coverage wider than that of the second cell 20. Further, FIG. 1 shows a hierarchical cell structure in which the second cell 20 is disposed inside the first cell 10. Note that the cell structure shown in FIG. 1 is merely an example. For example, the first and second cells 10 and 20 may have the same degree of coverage. In other words, the radio communication system according to this embodiment may be applied to a Homogeneous Network environment.

Next, an operation of the radio communication system according to this embodiment is explained in a more detailed manner. The radio communication system according to this embodiment enables the radio terminal 3 to discontinuously perform reception or transmission at an interval equal to or longer than a signal transmission/reception unit period (e.g., one subframe) in at least one of the first and second cells 10 and 20 when the inter-radio station carrier aggregation has been configured. The time in which the inter-radio station carrier aggregation has been configured can be expressed in different words as a time in which the radio terminal 3 is instructed to use the second cell 20 when the radio terminal 3 is already using the first cell 10. Further, the time in which the inter-radio station carrier aggregation has been configured can also be expressed as a time in which the radio terminal uses a Component Carrier (CC) (e.g., at least downlink CC) of the first radio station 1 as a Primary-Component Carrier (PCC) and also uses a Component Carrier (CC) (e.g., at least downlink CC) of the second radio station 2 as a Secondary-Component Carrier (SCC). When the inter-radio station carrier aggregation has been configured, the radio terminal 3 has active connections for both the first and second cells 10 and 20.

To enable the radio terminal 3 to perform discontinuous reception or transmission when the inter-radio station carrier aggregation has been configured, the radio communication system according to this embodiment operates as follows. That is, the first radio station 1 or 2 transmits constraint information to the radio terminal 3. The constraint information contains an information element necessary to specify at least one of a reception constraint and transmission constraint for at least one of the first and second cells 10 and 20 when the inter-radio station carrier aggregation is performed. Note that the reception constraint is a constraint related to downlink signal reception by the radio terminal 3 over one or more signal transmission/reception unit periods (e.g., one or more subframes). For example, the reception constraint includes a constraint indicating that the radio terminal 3 does not have to receive or decode a predetermined downlink signal in a predetermined period (or at a predetermined timing), a constraint indicating that the radio terminal 3 should receive or decode a predetermined downlink signal in a predetermined period (or at a predetermined timing), or the like. Examples of the predetermined downlink signal include a signal that is transmitted through a downlink control channel (e.g., the PDCCH in the LTE), a signal for transmitting paging, and a signal for transmitting system information. The transmission constraint is a constraint related to uplink signal transmission by the radio terminal 3 over one or more signal transmission/reception unit periods (e.g., one or more subframes). For example, the transmission constraint includes a constraint indicating that the transmission of an uplink signal (e.g., the Physical Uplink Shared Channel (PUSCH) in the LTE) by the radio terminal 3 is prohibited in a predetermined period (or at a predetermined timing), a constraint indicating that the transmission of an uplink signal is possibly permitted in a predetermined period (or at a predetermined timing), or the like. The one subframe period means the Transmission Time Interval (TTI) specified in the communication standards to which the radio communication system conforms (e.g., the 3GPP LTE). The length of one subframe period in the LTE is one millisecond.

For example, in order to specify at least one of the reception constraint and the transmission constraint, the constraint information may explicitly or implicitly indicate at least one of the following items (a) to (h):
(a) A period (or timing) in/at which a predetermined downlink signal should be received;
(b) A period (or timing) in/at which a predetermined downlink signal should be decoded;
(c) A period (or timing) in/at which a predetermined downlink signal does not have to be received;
(d) A period (or timing) in/at which a predetermined downlink signal does not have to be decoded;
(e) A period (or timing) in/at which the transmission of an uplink signal is prohibited;
(f) A period (or timing) in/at which an uplink signal can be transmitted;
(g) A period (or timing) in/at which an uplink signal may be transmitted; and
(h) A period (or timing) in/at which the transmission of an uplink signal may be permitted.

Although the above-described periods or timings are expressed from the standpoint of the radio terminal 3, they have the same meanings even when they are expressed from the standpoint of the radio stations 1 and 2.

Further, examples of possible reception constraints also include a setting of "reception gap" indicating the above-described item (c) or (d). Alternatively, it is also conceivable to indicate "Discontinuous Reception (DRX)" that is specified by a combination of the above-described items (a) and (c) or items (b) and (d). Note that a period corresponding to the item (a) or (b) is called "reception period", "reception On-period (or On-period)", or "Active period". Further, a period corresponding to the item (c) or (d) is called "non-reception period", "reception Off-period (or Off-period)", or "Inactive period".

As an example of the transmission constraint, it is conceivable to set "transmission gap" indicating the above-described item (e). Alternatively, it is also conceivable to indicate "masking of transmission timing" that is specified by a combination of the item (e) and one of the items (f) to (h), i.e., narrows down the timing (e.g., the subframe) at which the transmission of an uplink signal is permitted. Further, it is also conceivable to indicate "Discontinuous Transmission (DTX)" that is specified by a combination of the item (e) and one of the items (f) to (h). Note that a period corresponding to the item (e) is called "non-transmission period", "transmission Off-period (or Off-period)", or "Inactive period". Further, a period corresponding to the item (f), (g) or (h) is called "transmission period", "transmission On-period (or On-period)", or "Active period"

Further, the constraint information may directly or implicitly indicate at least one of the reception constraint and the transmission constraint. For example, the constraint information may include at least one of the following items:
(A) A request (or instruction) for application of a reception constraint;
(B) A request (or instruction) for application of a transmission constraint;
(C) Contents of a reception constraint;
(D) Contents of a transmission constraint;
(E) Control parameters regarding a reception constraint; and
(F) Control parameters regarding a transmission constraint.

The item (A) is used, for example, when the application of a reception constraint is requested in a state where the radio stations 1 and 2, or the radio stations 1 and 2 and the radio terminal 3, have common information indicating what kind of constraint is indicated by the reception constraint, or that information has been defined in the specifications. Similarly, the item (B) is used, for example, when the application of a transmission constraint is requested in a state where the radio stations 1 and 2 have common information indicating what kind of constraint is indicated by the transmission constraint, or that information has been defined in the specifications.

The item (C) is information indicating what kind of reception constraint is applied. For example, the item (C) indicates the setting of "reception gap", the instruction of "DRX", or the like. Similarly, the item (D) is information indicating what kind of transmission constraint is applied. For example, the item (D) indicates the setting of "transmission gap", the instruction for "masking of transmission timing", or the like.

The item (E) is information indicating a control parameter(s) that should be set in the reception constraint. For example, the item (E) indicates at least one of the above-described items (a) to (d). Similarly, the item (F) is information indicating a control parameter(s) that should be set in the transmission constraint. For example, the item (F) indicates at least one of the above-described items (e) to (h).

The radio terminal 3 may operate, for example, as follows. The radio terminal 3 receives constraint information from the radio station 1 or 2. Then, the radio terminal 3 performs a receiving operation in accordance with a reception constraint or a transmitting operation in accordance with a transmission constraint, in the inter-radio station carrier aggregation. For example, the radio terminal 3 may stop the decoding of the PDCCH of the second cell (i.e., the PDCCH blind-decoding) in one or more subframes included in a reception constraint for the second cell specified based on a reception constraint included in the constraint information. In this case, the reception constraint indicates that the radio terminal 3 does not have to decode a predetermined downlink signal in/at a predetermined period (or timing). Further, the radio terminal 3 may stop the operation of a transmission circuit components (e.g., an amplifier) related to the second cell or change the operation mode of the transmission circuit components to a low-power mode in one or more subframes included in a transmission constraint for the second cell specified based on a transmission constraint included in the constraint information. In this case, the transmission constraint indicates that the transmission of an uplink signal (e.g., the Physical Uplink Shared Channel (PUSCH) of the LTE) by the radio terminal 3 is prohibited in/at a predetermined period (or timing). In this way, the radio terminal 3 can suspend the receiving operation or the transmitting operation based on the constraint information when the inter-radio station carrier aggregation is being performed.

The constraint information may be applied to both of the first and second cells 10 and 20, or may be applied to either one of them. For example, the radio terminal 3 may derive the reception constraint or the transmission constraint (e.g., a reception gap, a transmission gap, a reception period, or a transmission period) for the second cell 20 by using the reception constraint or the transmission constraint (e.g., a reception gap, a transmission gap, DRX, or masking of transmission timing) for the first cell 10. In this case, the constraint information is only required to include an information element(s) indicating the reception constraint or the transmission constraint for the first cell 10 in order to specify the reception constraint or the transmission constraint for the second cell 20.

The reception constraint (or the transmission constraint) for the second cell 20 based on the constraint information may be configured independently of that for the first cell 10. An advantage of this method is that it is unnecessary to take account of the states of services (i.e., data transmission/reception) performed for the same radio terminal 3 in the radio stations 1 and 2.

Alternatively, the reception constraint (or transmission constraint) of the second cell 20 may be configured so as to be dependent on that for the first cell 10. For example, the reception gap (or transmission gap) in the second cell 20 may be configured so that at least a part of the reception gap (or transmission gap) in the second cell 20 does not overlap that in the first cell 10. For example, the reception gaps in the first and second cells 10 and 20 may be configured so that the start point of the reception period in the second cell 20 does not coincide with the start point of the reception period in the first cell 10. Similarly, the transmission gaps in the first and second cells 10 and 20 may be configured so that the start point of the transmission period in the second cell 20 does not coincide with the start point of the transmission period in the first cell 10. An advantage of this method is that it is possible to reduce the load on the radio terminal 3 and reduce the delay in its data transmission/reception by defining a period in which the radio terminal 3 does not need to simultaneously receive downlink signals from the radio stations 1 and 2 at the start of a reception period or defining a period in which the radio terminal 3 does not need to simultaneously transmit uplink signals to the radio stations 1 and 2 at the start of a transmission period, thereby enabling transmission/reception of as much downlink data or uplink data as possible in that period.

Further, for example, the reception gaps (or transmission gaps) in the first and second cells 10 and 20 may be determined so that the reception period (or transmission period) in the first cell 10 does not overlap that in the second cell 20 at all. An advantage of this method is that it is possible to prevent the radio terminal 3 from simultaneously receiving downlink signals from (or simultaneously transmitting uplink signals to) the radio stations 1 and 2 and thereby to considerably reduce the load on the radio terminal 3. In particular, when the radio terminal 3 is using a plurality of cells operated in different frequency bands, the load can be reduced. This is because it is conceivable to equip the radio terminal 3 with a hardware component (e.g., a radio frequency (RF) unit) for each frequency band in order to use a plurality of cells using different frequency bands, and it is expected in such cases that the parallel processing in which a plurality of hardware components simultaneously operate can be considerably reduced by the aforementioned method.

Further, for example, the reception period (or transmission period) in the first cell 10 may be determined so that it is included within the reception period (or the transmission period) in the second cell 20. Alternatively, the reception period (or the transmission period) in the second cell 20 may be determined so that it is included within the reception period (or the transmission period) in the first cell 10. For example, the reception gaps (or transmission gaps) in the first and second cells 10 and 20 may be configured so that the start point of the reception period (or the transmission period) in the second cell 20 coincides with the start point of the reception period (or the transmission period) in the first cell 10. According to this method, it is possible to reduce the delay in the data transmission/reception by defining opportunities (or periods) in which the radio terminal 3 can receive downlink data from the radio stations 1 and 2 (or transmit uplink data to different radio stations) in an overlapped manner, and also possible to prevent the radio stations 1 and 2 from simultaneously performing data transmission/reception with the same radio terminal 3 as much as possible by having the radio stations 1 and 2 mutually have information about the other station's data transmission/reception state with the radio terminal 3. That is, this method provides flexibility to the communication between the radio stations 1 and 2 and the radio terminal 3, thereby enabling them to determine whether a priority is given to the reduction in the delay in the data transmission/reception or the reduction in the load on the radio terminal according to the communication policy.

The constraint information may be transmitted from the first radio station 1 to the radio terminal 3 in the first cell 10, or transmitted from the second radio station 2 to the radio terminal 3 in the second cell 20. For example, the first radio station 1 may transmit the constraint information to the radio terminal 3 and the second radio station 2. Alternatively, the first radio station 1 may transmit the constraint information to the radio terminal 3 through the second radio station 2. In this case, although the first radio station 1 transmits a message containing the constraint information to the second radio station 2, the second radio station 2 does not necessarily have to recognize the contents of that message. Alternatively, the second radio station 2 may recognize the contents of the message. In the case where the second radio station 2 transmits the constraint information to the radio terminal 3 in the second cell 20, the second radio station 2 may transmit the constraint information as control information or may transmit it in a manner similar to that for transmitting other downlink data. In another example, the first radio station 1 may transmit the constraint information to the radio terminal 3 and the radio terminal 3 may forward the constraint information to the second radio station 2. In still another example, the second radio station 2 may transmit constraint information related to the second cell 20 to the first radio station 1 and the first radio station 1 may transmit the constraint information to the radio terminal 3. The transmission of constraint information between the first and second radio stations 1 and 2 may be performed through the core network 4.

Figure 2:
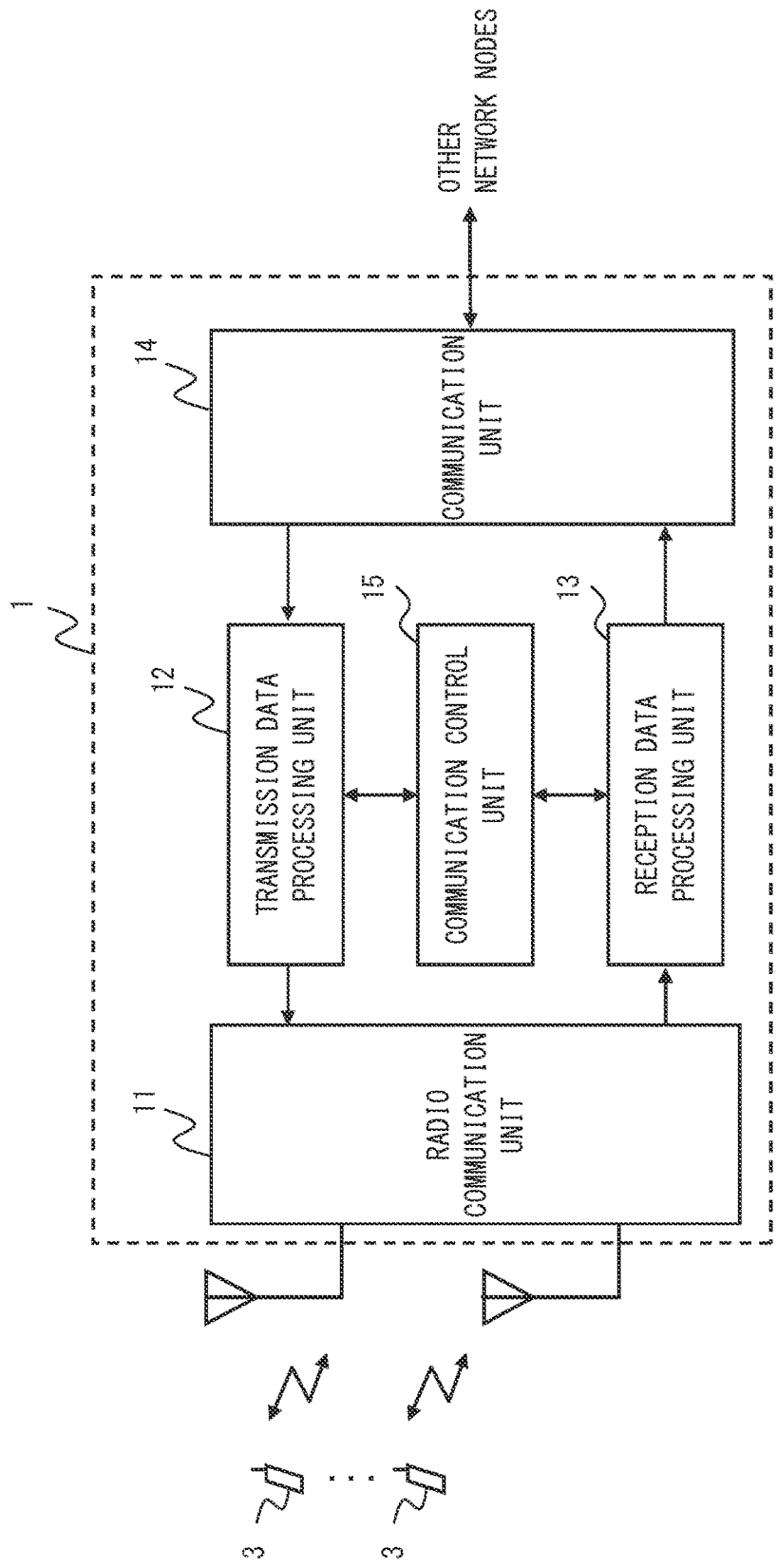
FIG. 2 shows a configuration example of a first radio station according to the first embodiment.

Next, configuration examples of the radio stations 1 and 2 and the radio terminal 3 according to this embodiment are explained. FIG. 2 is a block diagram showing a configuration example of the first radio station 1. A radio communication unit 11 receives an uplink signal transmitted from the radio terminal 3 thorough an antenna. A reception data processing unit 13 restores the received uplink signal. The obtained reception data is forwarded to another network node such as a data transfer device or a mobility management device in the core network 4, or to other radio stations through a communication unit 14. For example, uplink user data received from the radio terminal 3 is forwarded to a data transfer device in a higher-layer network. Further, non-access stratum (NAS) control data among control data received from the radio terminal 3 is forwarded to a mobility management device in a higher-layer network. Further, the reception data processing unit 13 receives, from a communication control unit 15, control data to be transmitted to the radio station 2, and transmits this control data to the radio station 2 through the communication unit 14.

A transmission data processing unit 12 acquires user data destined for the radio terminal 3 from the communication unit 14 and generates a transport channel by performing error correction encoding, rate matching, interleaving, and the like. Further, the transmission data processing unit 12 generates a transmission symbol sequence by adding control information to the data sequence of the transport channel. The radio communication unit 11 generates a downlink signal by performing carrier modulation based on the transmission symbol sequence, frequency conversion, signal amplification, and the like, and transmits the generated downlink signal to the radio terminal 3. Further, the transmission data processing unit 12 receives control data to be transmitted to the radio terminal 3 from the communication control unit 15 and transmits this control data to the radio terminal 3 through the radio communication unit 11.

The communication control unit 15 controls inter-radio station carrier aggregation using the first and second cells 10 and 20. Further, in an example, the communication control unit 15 may transmit the above-described constraint information to the radio terminal 3.

Figure 3:
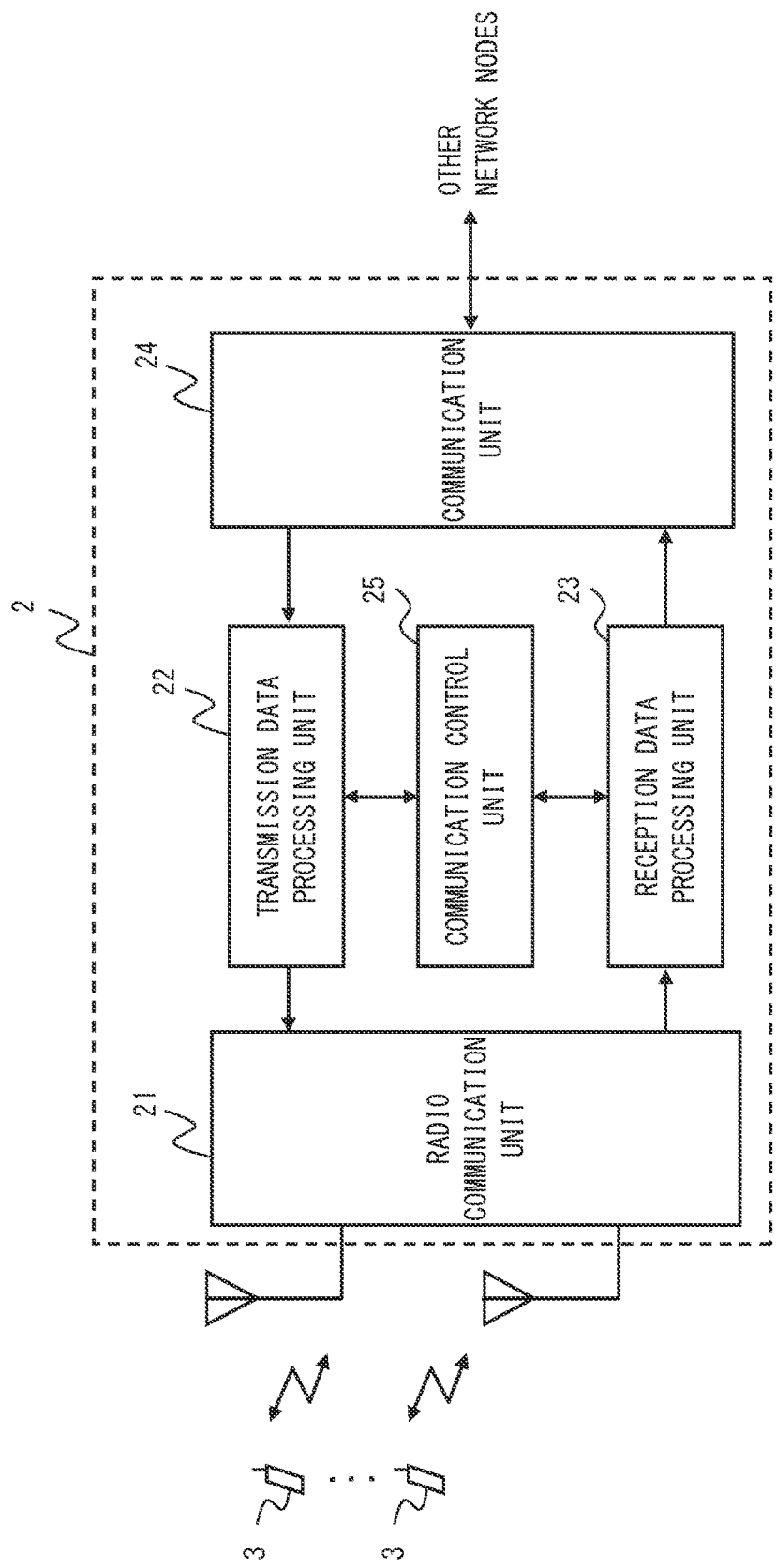
FIG. 3 shows a configuration example of a second radio station according to the first embodiment.

FIG. 3 is a block diagram showing a configuration example of the second radio station 2. The functions and the operations of a radio communication unit 21, a transmission data processing unit 22, a reception data processing unit 23, and a communication unit 24 shown in FIG. 3 are similar to those of their corresponding elements shown in FIG. 2, i.e., those of the radio communication unit 11, the transmission data processing unit 12, the reception data processing unit 13, and the communication unit 14.

A communication control unit 25 controls inter-radio station carrier aggregation using the first and second cells 10 and 20. Further, in an example, the communication control unit 25 may transmit the above-described constraint information to the radio terminal 3.

Figure 4:
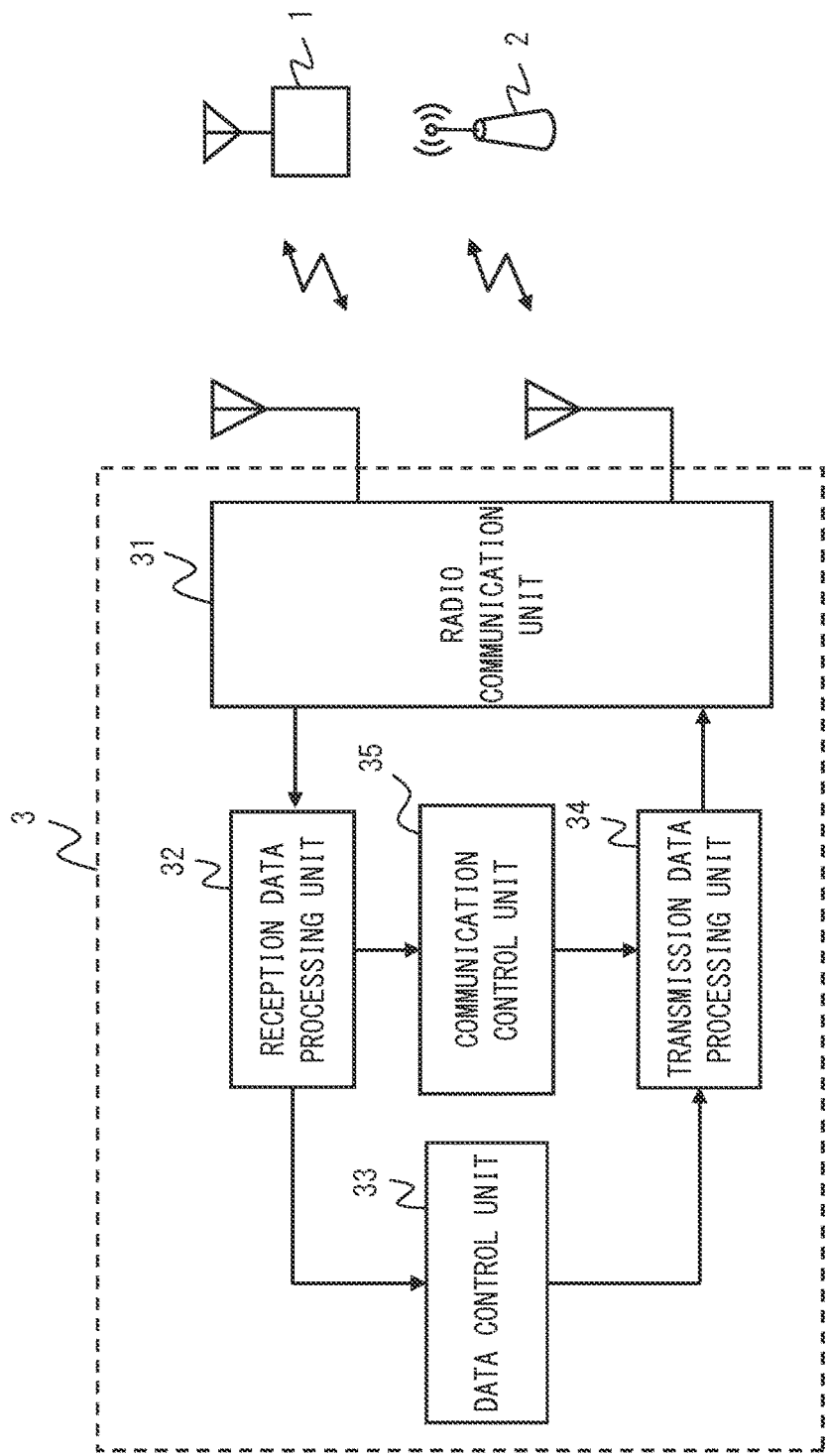
FIG. 4 shows a configuration example of a radio terminal according to the first embodiment.

FIG. 4 is a block diagram showing a configuration example of the radio terminal 3. A radio communication unit 31 supports carrier aggregation of a plurality of cells served by different radio stations, and is able to simultaneously use the plurality of cells (e.g., the cells 10 and 20) for transmitting or receiving signals. Specifically, the radio communication unit 31 receives a downlink signal from one or both of the radio stations 1 and 2 through an antenna. A reception data processing unit 32 restores reception data from the received downlink signal and sends the restored reception data to a data control unit 33. The data control unit 33 uses the reception data according to its purpose. Further, a transmission data processing unit 34 and a radio communication unit 31 generate an uplink signal by using transmission data supplied from the data control unit 33 and transmit the generated uplink signal to one or both of the radio stations 1 and 2.

A communication control unit 35, the radio terminal 3, controls inter-radio station carrier aggregation which uses the first and second cells 10 and 20. Further, the communication control unit 35 receives the constraint information from the first radio station 1 or the second radio station 2. Then, the communication control unit 35 performs a receiving operation (or transmitting operation) during the inter-radio station carrier aggregation, in accordance with a reception constraint (or a transmission constraint) specified based on the constraint information.

Next, Procedure Examples 1 to 3 of a communication control method in a radio communication system according to this embodiment are explained.

PROCEDURE EXAMPLE 1

Figure 5:
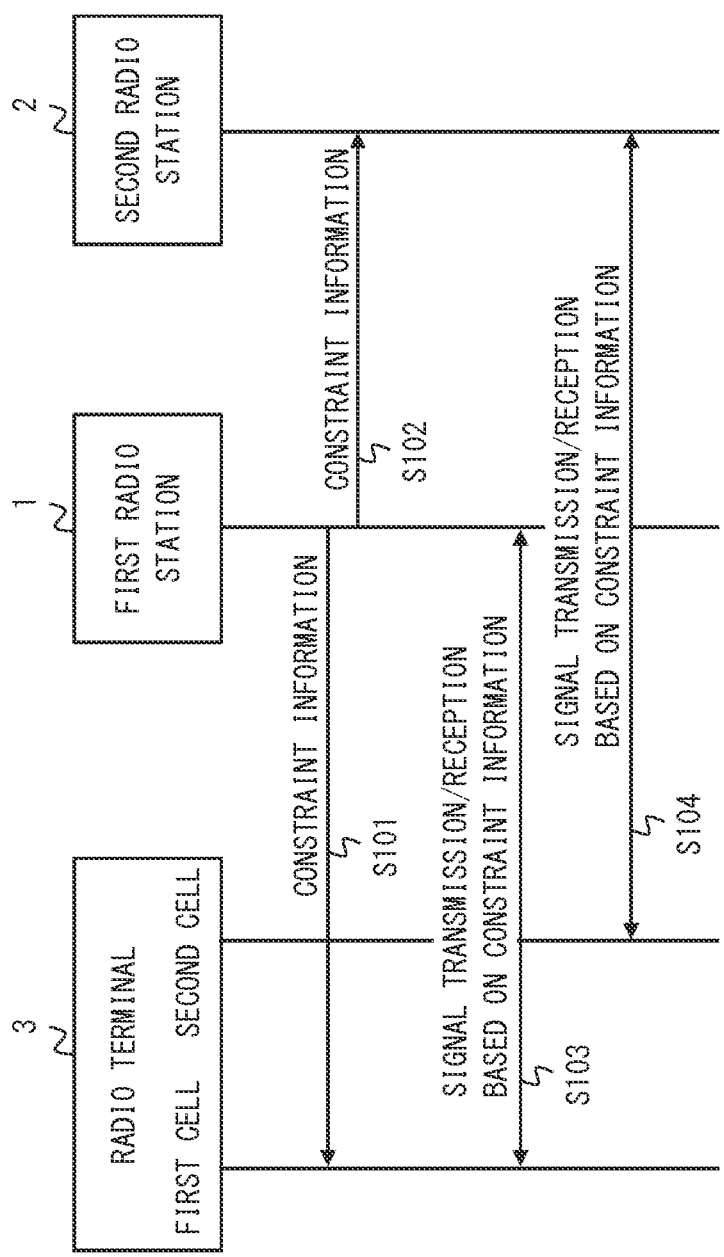
FIG. 5 is a sequence diagram showing an example of a communication control method in a radio communication system according to the first embodiment (Procedure Example 1)

In Procedure Example 1, the first radio station 1 transmits the above-described constraint information to the radio terminal 3 and the second radio station 2. FIG. 5 shows an example of a sequence diagram showing a communication control method according to the Procedure Example 1. In steps S101 and S102, the first radio station 1 transmits constraint information to the radio terminal 3 and the second radio station 2. In a step S103, the first radio station 1 and the radio terminal 3 perform transmission/reception of a signal in the first cell 10 according to a reception constraint (e.g., a reception gap) or a transmission constraint (e.g., a transmission gap) specified based on the constraint information. In a step S104, the second radio station 2 and the radio terminal 3 perform transmission/reception of a signal in the second cell 20 according to a reception constraint (e.g., a reception gap) or a transmission constraint (e.g., a transmission gap) specified based on the constraint information.

The constraint information transmitted to the radio terminal 3 may include, for example, information about a reception period in which the radio terminal 3 should receive a predetermined downlink signal in the first cell 10 and information about a reception period in which the radio terminal 3 should receive a predetermined downlink signal in the second cell 20. The radio terminal 3 may receive predetermined downlink signals on the first and second cells 10 and 20 only at the respective reception periods specified based on the constraint information. Accordingly, it is possible to prevent the radio terminal 3 from performing unnecessary receiving operations (or decoding operations) for a predetermined downlink signal and thereby to prevent (or reduce) wasteful power consumption.

The constraint information may include only the information necessary to specify the reception constraint (or transmission constraint) for either one of the first and second cells 10 and 20. For example, the first radio station 1 may transmit, to the radio terminal 3 and the second radio station 2, constraint information that is related only to the first cell 10 or related only to the second cell 20.

Further, the first radio station 1 may perform transmission or reception regarding the radio terminal 3 in the first cell 10 while taking into account the constraint information related to the second cell 20. In contrast to this, the second radio station 2 may perform transmission or reception regarding the radio terminal 3 in the second cell 20 while taking into account the constraint information related to the first cell 10. For example, the first radio station 1 may transmit a downlink signal to the radio terminal 3 in the first cell 10 during a reception gap for the radio terminal 3 in the second cell 20.

The constraint information transmitted from the first radio station 1 to the radio terminal 3 may be the same as that transmitted from the first radio station 1 to the second radio station 2, or may be different from that transmitted from the first radio station 1 to the second radio station 2. For example, the first radio station 1 may transmit constraint information related to both the first and second cells 10 and 20 to the radio terminal 3 and transmit constraint information related only to the second cell 20 to the second radio station 2.

PROCEDURE EXAMPLE 2

Figure 6:
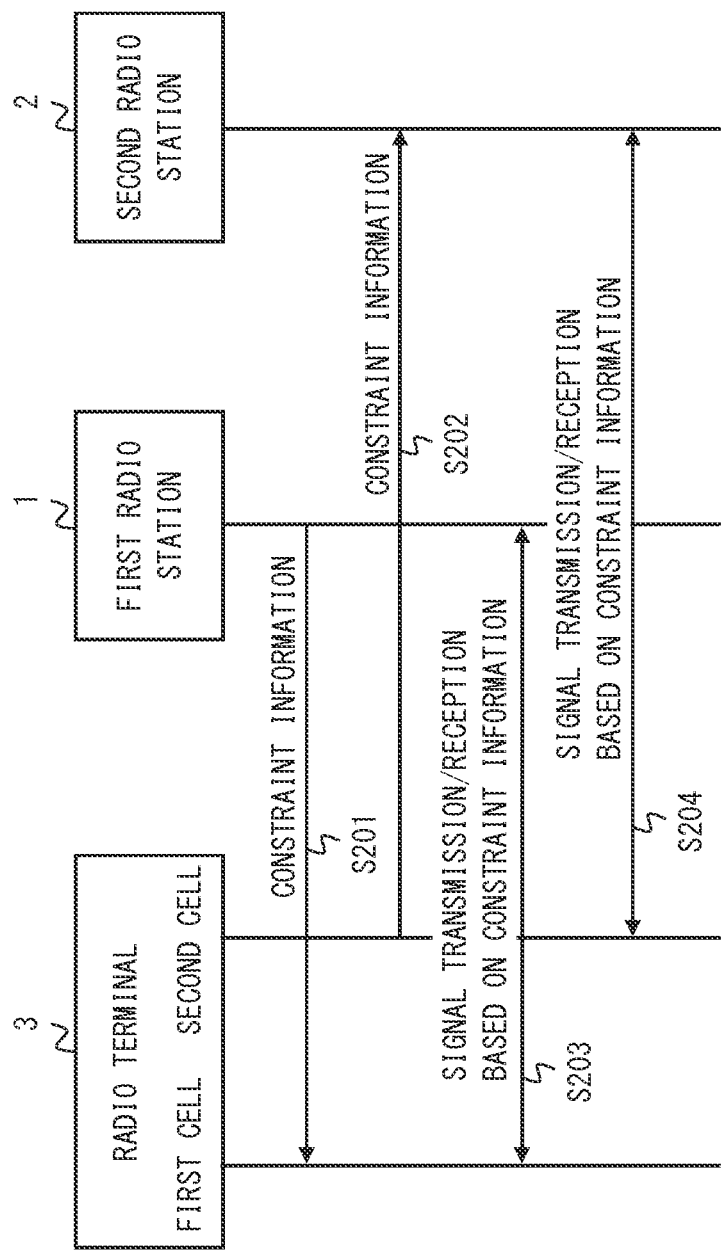
FIG. 6 is a sequence diagram showing another example of a communication control method in a radio communication system according to the first embodiment (Procedure Example 2)

In Procedure Example 2, the first radio station 1 transmits the above-described constraint information to the radio terminal 3 and the radio terminal 3 forwards that constraint information to the second radio station 2. FIG. 6 shows an example of a sequence diagram showing a communication control method according to the Procedure Example 2. In a step S201, the first radio station 1 transmits constraint information to the radio terminal 3. In a step S202, the radio terminal 3 forwards the constraint information to the second radio station 2. Processes in steps S203 and S204 are similar to those in the steps S103 and S104 shown in FIG. 5.

The constraint information transmitted from the first radio station 1 to the radio terminal 3 may include constraint information related to the first and second cells 10 and 20. In contrast to this, the constraint information transmitted from the radio terminal 3 to the second radio station 2 may include only constraint information related to the second cell 20. However, the constraint information transmitted from the radio terminal 3 to the second radio station 2 may be the same as that transmitted from the first radio station 1 to the radio terminal 3. The radio terminal 3 may voluntarily transmit the constraint information related to the second cell 20 to the second radio station 2, or may transmit the constraint information to the second radio station 2 in response to a report instruction sent from the second radio station 2.

PROCEDURE EXAMPLE 3

Figure 7:
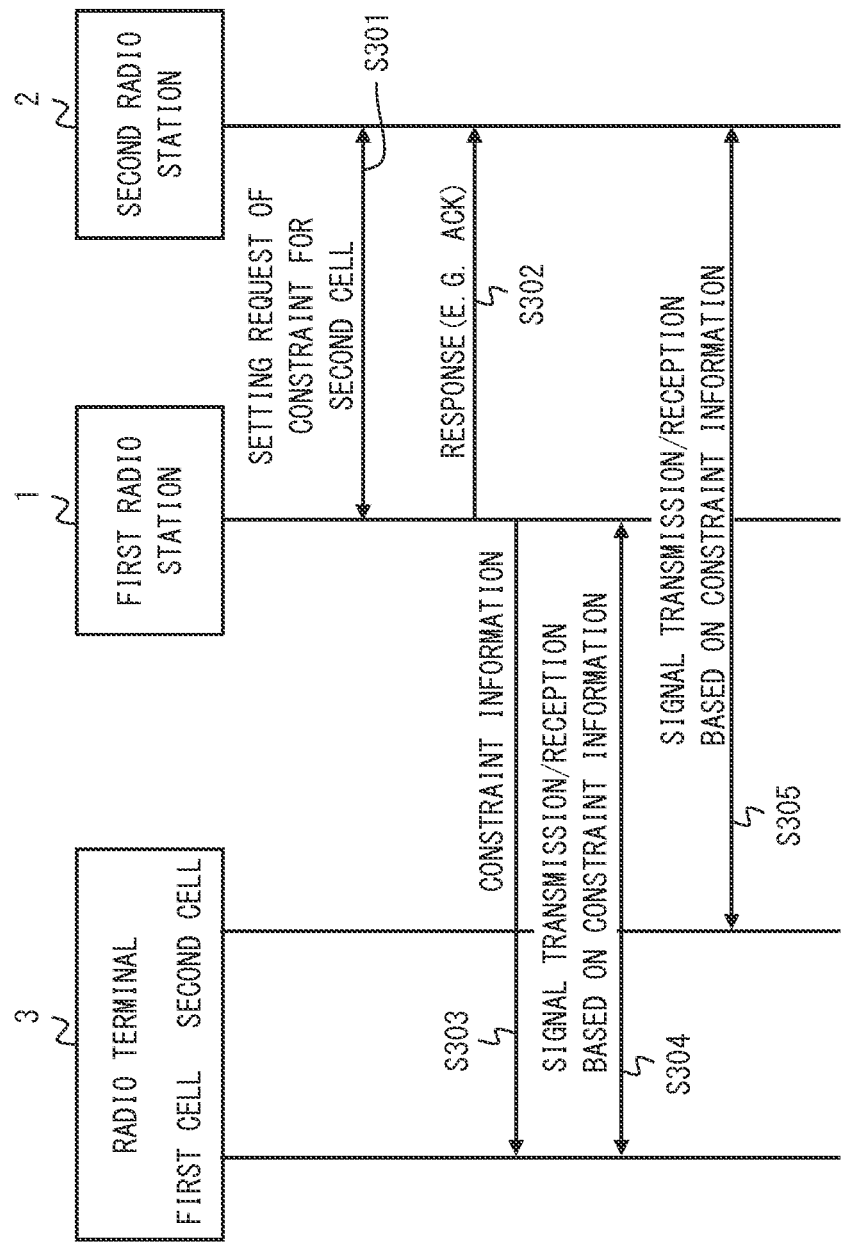
FIG. 7 is a sequence diagram showing another example of a communication control method in a radio communication system according to the first embodiment (Procedure Example 3)

In Procedure Example 3, the constraint information is transmitted to the radio terminal 3 based on a request from the second radio station 2. The constraint information is generated by the first radio station 1 or the second radio station 2. FIG. 7 shows an example of a sequence diagram showing a communication control method according to the Procedure Example 3. In a step S301, the second radio station 2 sends, to the first radio station 1, a request for setting a constraint on signal reception or transmission performed by the radio terminal 3 in the second cell 20. In this process, the second radio station 2 may also transmit constraint information related to the second cell 20 to the first radio station 1.

In a step S302, the first radio station 1 sends, to the second radio station 2, a response indicating whether or not the first radio station 1 approves the constraint information related to the second cell 20, that is, whether or not the first radio station 1 approves the application of the constraint for the second cell. In the case where the first radio station 1 does not receive constraint information from the second radio station 2 when the first radio station 1 receives the request in the step S301, the first radio station 1 may transmit constraint information related to the second cell 20 to the second radio station 2. When the first radio station 1 approves the application of the constraint for the second cell 20, the first radio station 1 transmits to the radio terminal 3 the constraint information related to the second cell 20 (step S303). Processes in steps S304 and S305 are similar to those in the steps S103 and S104 shown in FIG. 5.

In a step S302, the first radio station 1 may also transmit, to the second radio station 2, constraint information related to the first cell 10 for the radio terminal 3. Similarly, in a step S303, the first radio station 1 may also transmit, to the radio terminal 3, constraint information related to the first cell 10.

When the first radio station 1 has received constraint information related to the second cell from the second radio station 2, the first radio station 1 may, instead of accepting the constraint information received from the second radio station 2, generate (or configure) new constraint information related to the second cell and transmit the generated (or configured) constraint information to the second radio station 2.

Modification of Procedure Example 3

The first radio station 1 may request the second radio station 2 to generate (or configure) constraint information related to the second cell 20. In this case, the second radio station 2 may transmit constraint information related to the second cell 20 to the first radio station 1 and the first radio station 1 may transmit the received constraint information to the radio terminal 3.

Second Embodiment

In this embodiment, an example where the above-described first embodiment is applied to a 3GPP LTE system is explained. A configuration example of a radio communication system according to this embodiment may be similar to that shown in FIG. 1. Note that the radio stations 1 and 2 correspond to eNBs, the radio terminal 3 corresponds to an UE, and the core network 4 corresponds to an EPC (Evolved Packet Core). Transmission and reception of information between radio stations (i.e., between eNBs) may use an X2 interface, which is a direct interface, may use an S1 interface through the EPC, or may use a newly-defined interface (e.g., an X3 interface). A radio terminal (UE) 3 supports carrier aggregation of a plurality of cells served by different radio stations (eNBs) (called "Inter-eNB CA" or "Inter-Site CA"). Note that the "Inter-eNB CA" in this specification is not limited to actual simultaneous reception or transmission of signals on the cells of different eNBs. That is, it includes: a state where the radio terminal (UE) actually receives or transmits a signal (e.g., user data or control information) in either one of the cells of different eNBs although the radio terminal is able to receive or transmit in both of the cells of different eNB; a state where the radio terminal receives or transmits signals of different types in the respective cells of different eNBs; and a state where the radio terminal uses each of the cells of different eNBs for either signal reception or signal transmission.

The following explanation is given on the assumption that: the radio stations 1 and 2 are eNBs 1 and 2; the radio terminal 3 is an UE 3; and the core network 4 is an EPC 4. Further, it is assumed that the UE 3 performs inter-radio base station carrier aggregation (Inter-eNB CA) in which the UE 3 uses the cell 20 of the eNB 2 as a secondary cell (SCell) while the UE 3 is already using the cell 10 of the eNB 1 as a primary cell (PCell). Note that the primary cell (PCell) is a cell that has already been used since before the CA is started. In contrast to this, the second cell (SCell) is a cell that is used (activated) in addition to the PCell or in dependence thereon on the precondition that the UE 3 is already connected to the primary cell. Non-Access Stratum (NAS) mobility information, security information (or security input), and the like are transmitted and received through the PCell when a radio connection is established (i.e., at the time of RRC Connection Establishment) or reestablished (i.e., at the time of RRC Connection Re-establishment). A DL Component Carrier used for the PCell is a DL PCC, and an UL Component Carrier used for the PCell is an UL PCC. Similarly, a DL Component Carrier used for the SCell is a DL SCC, and an UL Component Carrier used for the SCell is an UL SCC.

The eNB 1 or 2 transmits constraint information to the UE 3. The constraint information contains information necessary to specify at least one of a reception constraint and transmission constraint for at least one of the PCell and the SCell when the SCell (second cell 20) is activated for the inter-eNB carrier aggregation. The UE 3 receives the constraint information from the eNB 1 or 2. Then, the UE 3 performs a receiving operation in accordance with a reception constraint or a transmitting operation in accordance with a transmission constraint, in the inter-eNB carrier aggregation.

For example, in order to specify at least one of the reception constraint and the transmission constraint, the constraint information may explicitly or implicitly indicate at least one of the following items (a) to (h):

(a) A period (or timing) in/at which a predetermined downlink signal (DL Signal) should be received;
(b) A period (or timing) in/at which a predetermined downlink signal should be decoded;
(c) A period (or timing) in/at which a predetermined downlink signal does not have to be received;
(d) A period (or timing) in/at which a predetermined downlink signal does not have to be decoded;
(e) A period (or timing) in/at which the transmission of an uplink signal (UL Signal) is prohibited;
(f) A period (or timing) in/at which an uplink signal can be transmitted;
(g) A period (or timing) in/at which an uplink signal may be transmitted; and
(h) A period (or timing) in/at which the transmission of an uplink signal may be permitted.

Although the above-described periods or timings are expressed from the standpoint of the UE 3, they have the same meanings even when they are expressed from the standpoint of the eNBs 1 and 2.

The predetermined downlink signal (DL signal) is, for example, a signal (L1/2 control signaling) transmitted through a PDCCH or an Enhanced PDCCH (EPDCCH), which is a downlink control channel. This signal includes scheduling information regarding downlink radio resources allocated for data transmission to the UE or the like, or use permission information (UL grant) of uplink radio resources used for data transmission or the like by the UE. Alternatively, the predetermined downlink signal (DL signal) may be a signal for transmitting Paging or a signal for transmitting System information.

Further, examples of possible reception constraints also include a setting of "reception gap" indicating the above-described item (c) or (d). Alternatively, it is also conceivable to indicate "Discontinuous Reception (DRX)" that is specified by a combination of the above-described items (a) and (c) or items (b) and (d). Note that when DRX is indicated, an entirely-same setting or a partially-same setting may be used for both the first cell 10 (e.g., the PCell) and the second cell 20 (e.g., the SCell) as the setting related to the DRX. Alternatively, the whole setting related to the DRX may be independently set to the first cell 10 and the second cell 20. Examples of conceivable settings related to the DRX include On-Duration (OnDurationTimer), drx-InactivityTimer, drx-RetransmissionTimer, longDRX-CycleStartOffset, short-DRX-Cycle, and drxShortCycleTimer, HARQ RTT Timer. Further, the UE3 may operate all or some of the above-described timers used for the DRX in a cooperative manner for the first and second cells 10 and 20. Alternatively, the UE3 may operate them independently for the first and second cells 10 and 20. In this way, the DRX can be performed in a flexible manner according to the data transmission state in each of the first and second cells 10 and 20. Although, in general, the operation of timers used for the DRX is performed in the radio terminal, a corresponding operation may be performed in the radio base station.

As an example of the transmission constraint, it is conceivable to set "transmission gap" indicating the above-described item (e). Alternatively, it is also conceivable to indicate "masking of transmission timing" that is specified by a combination of the item (e) and one of the items (f) to (h), i.e., narrows down the timing (e.g., subframe) at which the transmission of an uplink signal is permitted.

Further, the constraint information may directly or implicitly indicate at least one of the reception constraint and the transmission constraint. For example, the constraint information may include at least one of the following items:
(A) A request (or instruction) of application of a reception constraint;
(B) A request (or instruction) of application of a transmission constraint;
(C) Contents of a reception constraint;
(D) Contents of a transmission constraint;
(E) Control parameters regarding a reception constraint; and
(F) Control parameters regarding a transmission constraint.

The item (A) is used, for example, when the application of a reception constraint is requested in a state where the eNBs 1 and 2, or the eNBs 1 and 2 and the UE 3 have common information indicating what kind of constraint is indicated by the reception constraint, or that information has been defined in the specifications. Similarly, the item (B) is used, for example, when the application of a transmission constraint is requested in a state where the eNBs 1 and 2 have common information indicating what kind of constraint is indicated by the transmission constraint, or that information has been defined in the specifications.

The item (C) is information indicating what kind of reception constraint is applied. For example, the item (C) indicates the setting of "reception gap", the instruction of "DRX", or the like. Similarly, the item (D) is information indicating what kind of transmission constraint is applied. For example, the item (D) indicates the setting of "transmission gap", the instruction for "masking of transmission timing", or the like.

The item (E) is information indicating a control parameter(s) that should be set in the reception constraint. For example, the item (E) indicates at least one of the above-described items (a) to (d). Similarly, the item (F) is information indicating a control parameter(s) that should be set in the transmission constraint. For example, the item (F) indicates at least one of the above-described items (e) to (h).

The constraint information may be transmitted from the eNB 1 to the UE 3 in the first cell 10, or transmitted from the eNB 2 to the UE 3 in the second cell 20. For example, the eNB 1 may transmit the constraint information to the UE 3 and the eNB 2. Further, the eNB 1 may transmit the constraint information to the UE 3 through the eNB 2. In this case, although the eNB 1 transmits a message containing the constraint information to the eNB 2 through an X2 interface (or a new interface), the eNB 2 does not necessarily have to recognize the contents of the message. Alternatively, the eNB 2 may recognize the contents of the message. In the case where the eNB 2 transmits the constraint information to the UE 3 in the second cell 20, the eNB 2 may transmit the constraint information by using a Signaling Radio Bearer (SRB) as control information or may transmit it by using a Data Radio Bearer (DRB) in a manner similar to that for transmitting other downlink data. In other examples, the eNB 1 may transmit the constraint information to the UE 3 and the UE 3 may forward the constraint information to the eNB 2. Further, in other examples, the eNB 2 may transmit constraint information related to the second cell 20 to the eNB 1 and the eNB 1 may transmit the constraint information to the UE 3. The transmission of constraint information between the eNB 1 and the eNB2 may be performed through the core network 4 by using an S1 interface.

The constraint information may be applied to both of the PCell (first cell 10) and the SCell (second cell 20), or may be applied to either one of them.

The reception constraint (or the transmission constraint) for the SCell based on the constraint information may be configured independently of that for the PCell. Alternatively, the reception constraint (or the transmission constraint) of the SCell may be configured so as to be dependent on that for the PCell. For example, the reception gap (or the transmission gap) in the SCell may be configured so that at least a part of the reception gap (or the transmission gap) in the SCell does not overlap that of the PCell. For example, the reception gaps in the PCell and the SCell may be configured so that the start point of the reception period in the SCell does not coincide with the start point of the reception period in the PCell. Similarly, the transmission gaps in the PCell and the SCell may be configured so that the start point of the transmission period in the SCell does not coincide with the start point of the transmission period in the PCell.

Further, for example, the reception gaps (or the transmission gaps) in the PCell and the SCell may be determined so that the reception period (or the transmission period) in the PCell does not overlap that in the SCell at all.

Further, for example, the reception gap (or the transmission gap) in the SCell may be determined so that it is included within the reception gap (or the transmission gap) in the PCell. In other words, the reception period (or the transmission period) in the PCell may be determined so that it is included within the reception period (or the transmission period) in the SCell. Alternatively, the reception gap (or the transmission gap) in the PCell may be determined so that it is included within the reception gap (or the transmission gap) in the SCell. In other words, the reception period (or the transmission period) in the SCell may be determined so that it is included within the reception period (or the transmission period) in the PCell.

Procedure Examples 4 to 8 of a communication control method performed in a radio communication system according to this embodiment are explained hereinafter. In Procedure Examples 4 to 6, example cases where a reception gap (Rx gap) specified based on constraint information indicates a period (one or more subframes) in which a PDCCH does not have to be decoded are explained. Further, in the following explanation, a period in which a PDCCH should be received and decoded is called "ON-period (or Active period) and a period in which a PDCCH does not have to be decoded is called "OFF-period (or Inactive period). For example, the OFF-period corresponds to a reception gap (i.e., a period in which a reception gap is effective).

PROCEDURE EXAMPLE 4

Figure 8:
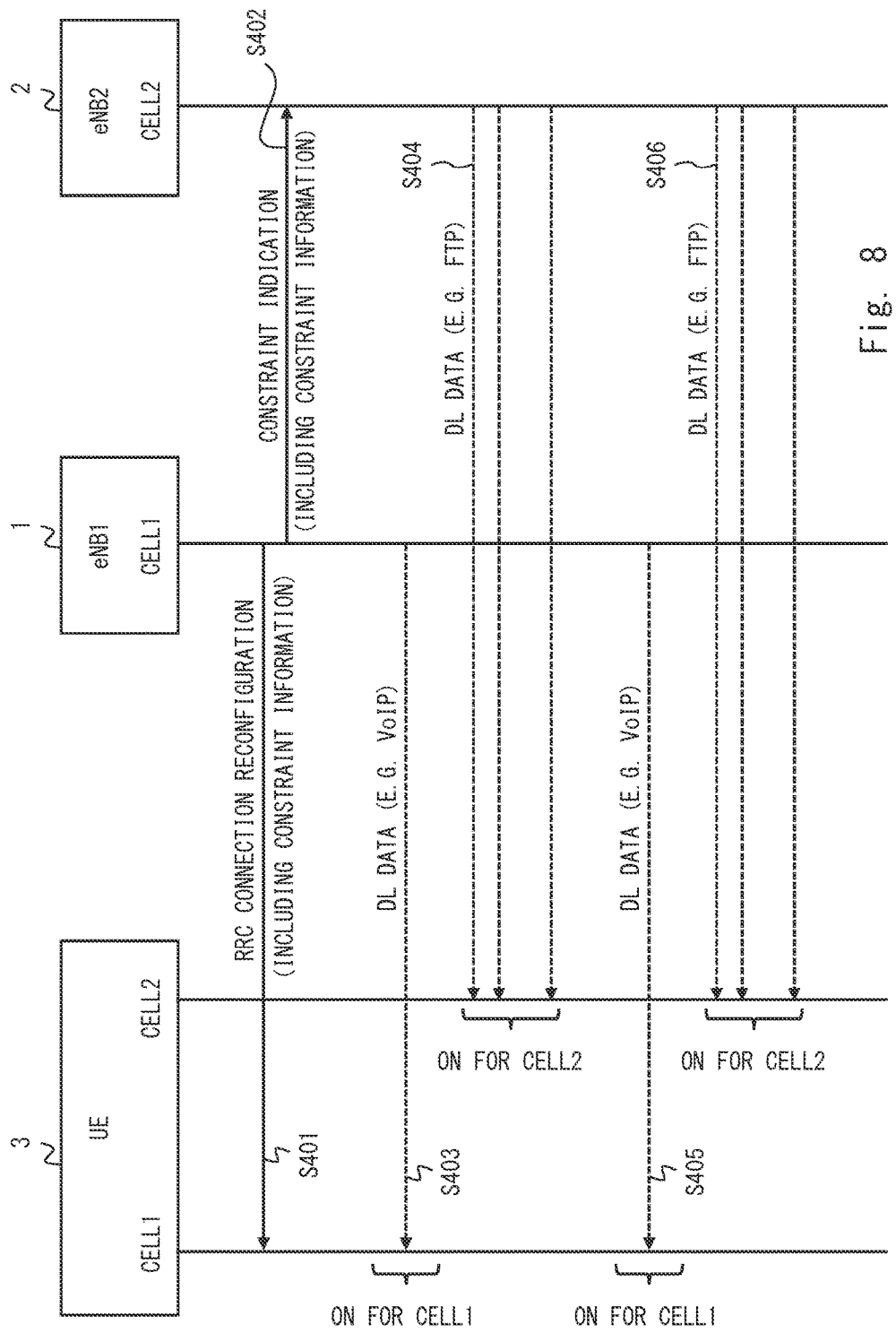
FIG. 8 is a sequence diagram showing an example of a communication control method in a radio communication system according to a second embodiment (Procedure Example 4)

Procedure Example 4 corresponds to the Procedure Example 1 explained in the first embodiment. That is, the eNB 1 transmits, to the UE 3 and the eNB 2, constraint information necessary to specify a reception gap. FIG. 8 shows an example of a sequence diagram showing the Procedure Example 4. Note that in FIG. 8, the first and second cells 10 and 20 are expressed as "CELL1" and "CELL2", respectively. In a step S401, the eNB 1 transmits a message (RRC Connection Reconfiguration) containing constraint information to the UE 3. In a step S402, the eNB 1 transmits a message (Connection indication) containing the constraint information to the eNB 2.

In steps S403 to S406, the eNBs 1 and 2 transmit downlink data (DL data) in the CELL1 and the CELL2, respectively, based on the constraint information, and the UE 3 receives the DL data transmitted from the eNBs 1 and 2. For example, in a reception period (ON-period) in the CELL1, the eNB 1 transmits DL data for the UE 3 (e.g., VoIP data) and the UE 3 can receive the DL data (e.g., VoIP data) by decoding the PDCCH (steps S403 and S405). Meanwhile, in a reception period (ON-period) in the CELL2, the eNB 2 transmits DL data for the UE 3 (e.g., FTP data) and the UE 3 can receive the DL data (e.g., FTP data) by decoding the PDCCH (steps S404 and S406).

The UE 3 does not need to decode the PDCCH of the CELL 1 in a reception gap (OFF-period) for the CELL1. Similarly, the UE 3 does not need to decode the PDCCH of the CELL 2 in a reception gap (OFF-period) for the CELL2. In this way, it is possible to avoid unnecessary PDCCH reception (or decoding) and thereby to reduce the power consumption of the UE 3. In FIG. 8, the reception gap (OFF-period) in the CELL1 corresponds to the whole period in the CELL1 except for the ON-period. Similarly, the reception gap (OFF-period) in the CELL2 corresponds to the whole period in the CELL2 except for the ON-period.

The constraint information may include only the information necessary to specify the reception gap (OFF-period) in either one of the CELL1 and the CELL2. For example, the eNB 1 may transmit, to the UE 3 and the eNB 2, constraint information that is related only to the CELL1 or related only to the CELL2.

Further, the eNB 1 may perform transmission or reception regarding the UE 3 in the CELL1 while taking into account the constraint information related to the CELL2. In contrast to this, the eNB 2 may perform transmission or reception regarding the UE 3 in the CELL2 while taking into account the constraint information related to the CELL1. For example, the eNB 1 may transmit a downlink signal to the UE 3 in the CELL1 during a reception gap (OFF-period) for the UE 3 in the CELL2.

The constraint information transmitted from the eNB 1 to the UE 3 may be the same as that transmitted from the eNB 1 to the eNB 2, or may be different from that transmitted from the eNB 1 to the eNB 2. For example, the eNB 1 may transmit constraint information related to both the CELL1 and the CELL2 to the UE 3 and transmit constraint information related only to the CELL2 to the eNB 2.

The constraint information (i.e., a reception constraint or/and a transmission constraint specified by the constraint information) may be made effective at the moment when the UE or the eNB2 receives that constraint information from the eNB1 or when a predetermined time has elapsed after the UE or the eNB2 receives that constraint information. The predetermined time may be specified by transmitting it with the constraint information, or may be configured in advance in the UE 3 and the eNB 2.

Figure 9:
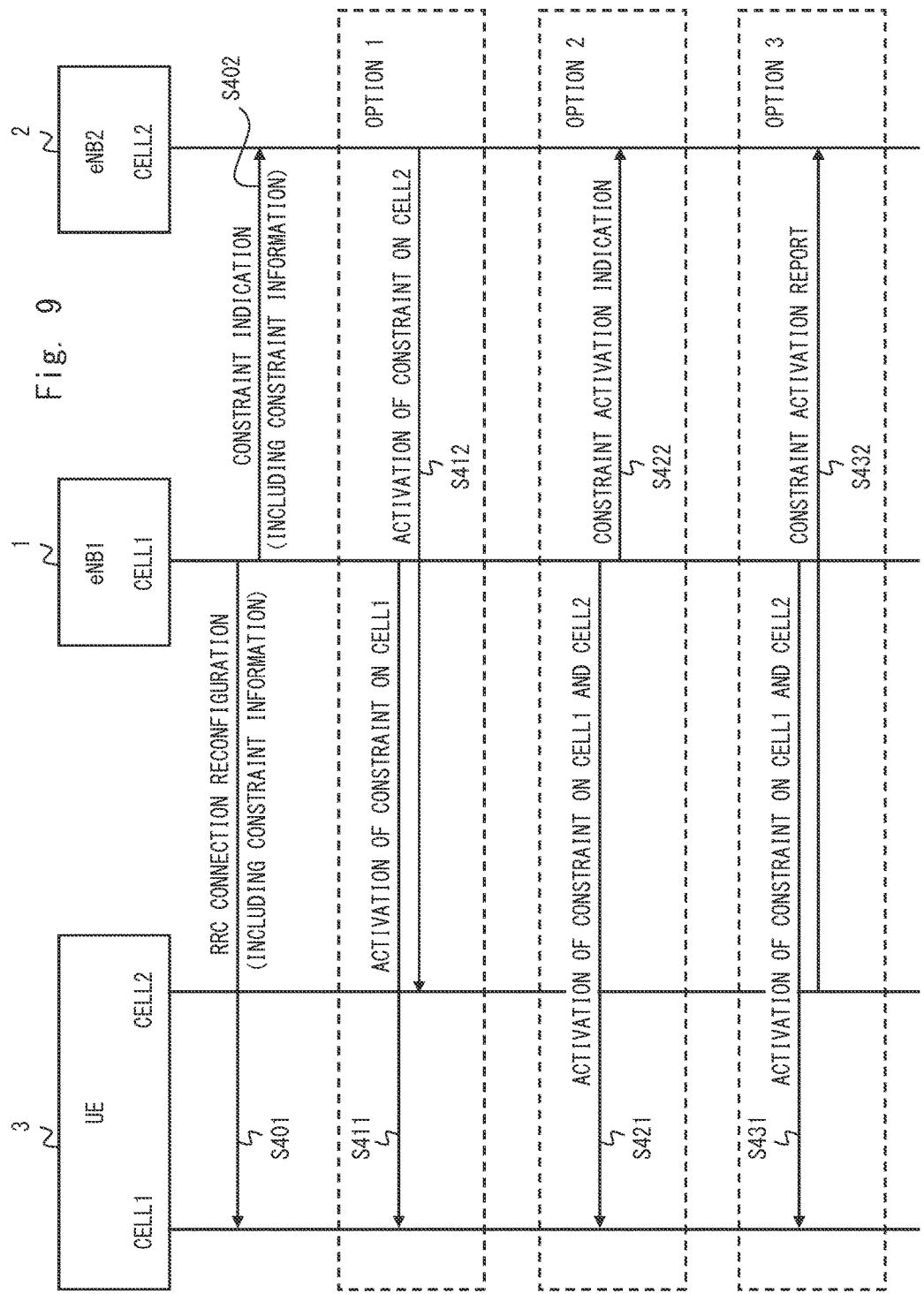
FIG. 9 is a sequence diagram showing another example of a communication control method in a radio communication system according to the second embodiment (modification of Procedure Example 4)

The constraint information may be made effective, for example, in accordance with the below-shown procedure. FIG. 9 shows Options 1 to 3 of a procedure for making the constraint information effective. Processes in steps S401 and S402 in FIG. 9 are similar to those in the steps S401 and S402 shown in FIG. 8. Steps S411 and S412 in FIG. 9 represent the Option 1. That is, in the step S411, the eNB 1 transmits to the UE 3 an instruction for making constraint information related to the CELL1 effective (Activation of constraint on CELL1). In the step S412, the eNB 2 transmits to the UE 3 an instruction for making constraint information related to the CELL2 effective (Activation of constraint on CELL2).

Steps S421 and S422 in FIG. 9 represent the Option 2. In the step S421, the eNB 1 transmits to the UE 3 an instruction for making constraint information related to the CELL1 and the CELL 2 effective (Activation of constraint on CELL1 and CELL2). At this point, as shown in the step S422, the eNB 1 may notify the eNB 2 that the eNB 1 has made the constraint information effective for the UE 3 (Constraint activation indication).

Steps S431 and S432 in FIG. 9 represent the Option 3. In the step S431, the eNB 1 transmits to the UE 3 an instruction for making constraint information related to the CELL1 and the CELL 2 effective (Activation of constraint on CELL1 and CELL2). In the step S432, the UE 3 notifies the eNB 2 that the constraint information for the CELL2 has become effective (Constraint activation report).

PROCEDURE EXAMPLE 5

Figure 10:
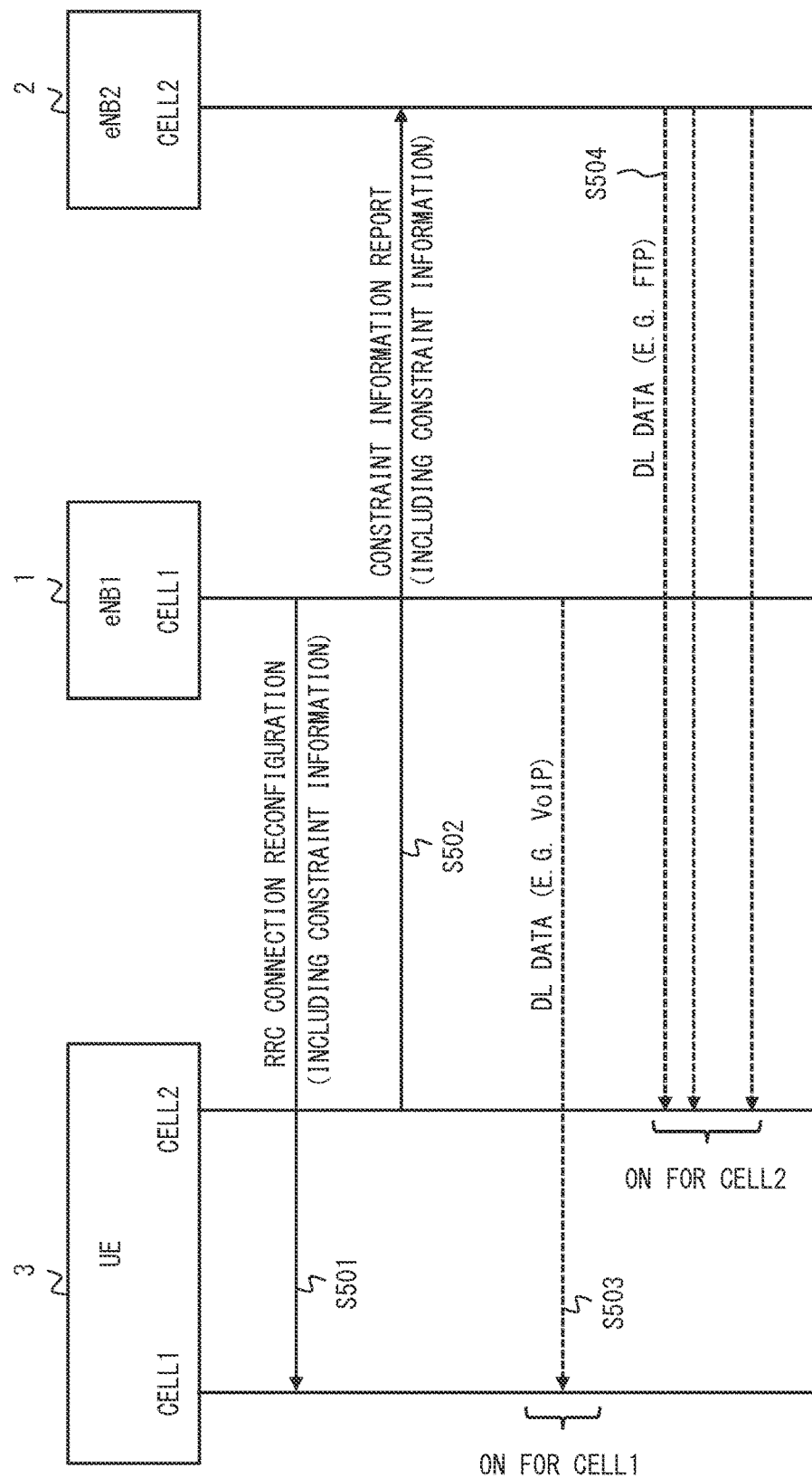
FIG. 10 is a sequence diagram showing another example of a communication control method in a radio communication system according to the second embodiment (Procedure Example 5)

Procedure Example 5 corresponds to the Procedure Example 2 explained in the first embodiment. That is, the eNB 1 transmits constraint information to the UE 3 and the UE 3 forwards the constraint information to the eNB 2. FIG. 10 shows an example of a sequence diagram showing the Procedure Example 5. In FIG. 10, the first and second cells 10 and 20 are expressed as "CELL1" and "CELL2", respectively. In a step S501, the eNB 1 transmits a message (RRC Connection Reconfiguration) containing constraint information to the UE 3. In a step S502, the UE 3 transmits a message (Constraint information report) containing constraint information to the eNB 2. The UE 3 may voluntarily transmit the constraint information related to the CELL2 to the eNB 2, or may transmit the constraint information to the eNB 2 in response to a constraint information report instruction (Constraint information report request) sent from the eNB 2. Processes in steps S503 and S505 in FIG. 10 are similar to those in the steps S403 and S404 shown in FIG. 8.

The constraint information transmitted from the eNB 1 to the UE 3 may include constraint information related to the CELL1 and the CELL2. In contrast to this, the constraint information transmitted from UE 3 to the eNB 2 may include only constraint information related to the CELL2. However, the constraint information transmitted from UE 3 to the eNB 2 may be the same as that transmitted from the eNB 1 to the UE 3.

PROCEDURE EXAMPLE 6

Figure 11:
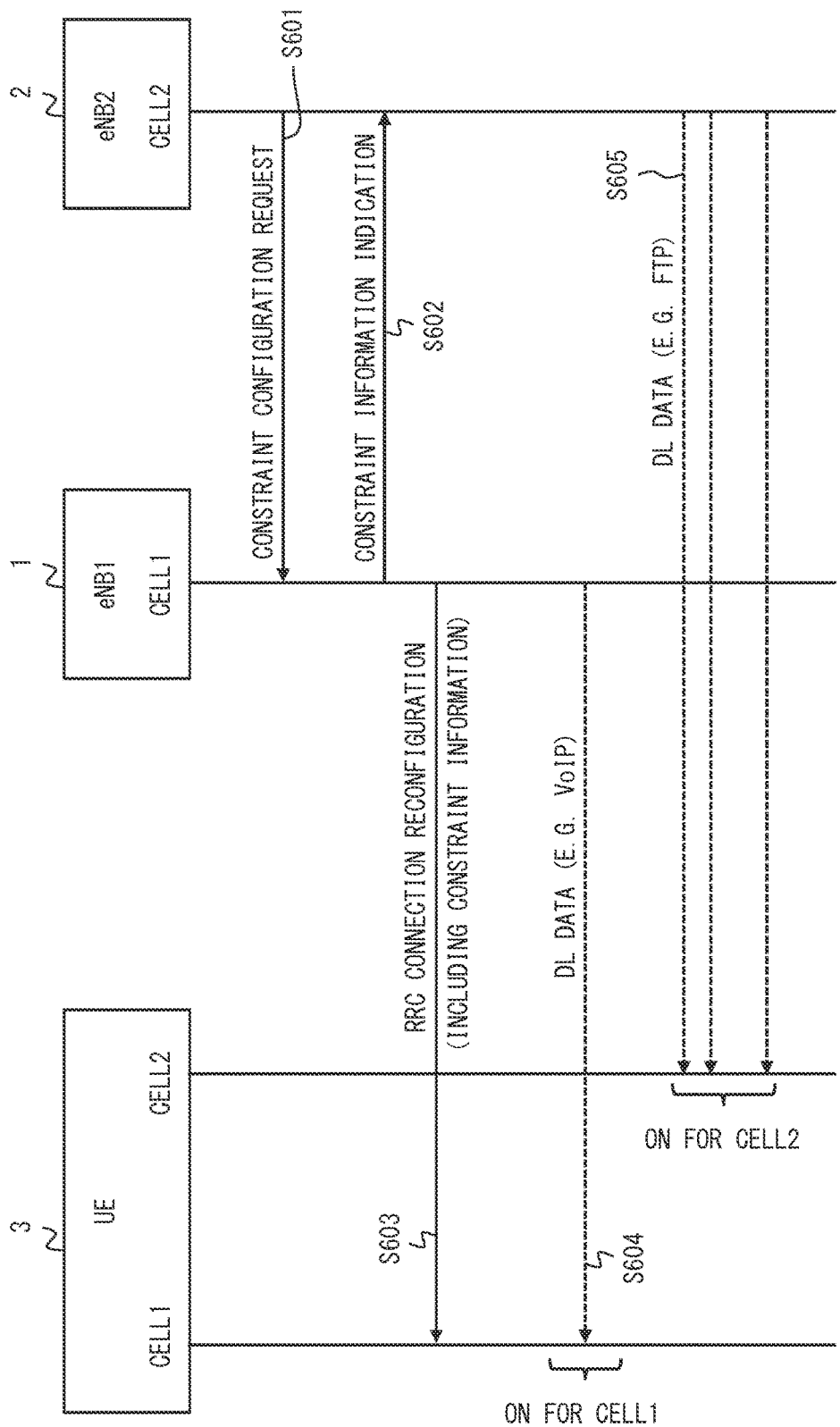
FIG. 11 is a sequence diagram showing another example of a communication control method in a radio communication system according to the second embodiment (Procedure Example 6)

Procedure Example 6 corresponds to the Procedure Example 3 explained in the first embodiment. That is, the constraint information is transmitted to the UE 3 based on a request from the eNB 2. The constraint information is generated by the eNB 1 or the eNB 2. FIG. 11 shows an example of a sequence diagram showing a communication control method according to the Procedure Example 6. In FIG. 11, the first and second cells 10 and 20 are expressed as "CELL1" and "CELL2", respectively. In a step S601, the eNB 2 sends to the eNB 1 a request for setting a constraint (i.e., a reception constraint or a transmission constraint) on signal reception or transmission performed by the UE 3 in the CELL2 (Constraint configuration request (for CELL2)).

In a step S602, the eNB 1 sends to the eNB 2 a response indicating whether or not the eNB 1 approves the constraint information related to the CELL2, that is, whether or not the eNB 1 approves the application of the constraint for the CELL2. When the eNB 1 approves the application of the constraint for the CELL2, the eNB 1 transmits to the eNB 2 the constraint information related to the CELL2 (Constraint information indication). Further, in a step S603, the eNB 1 transmits to the UE 3 the constraint information related to the CELL2 (RRC Connection Reconfiguration (including Constraint information)). In a step S603, the eNB 1 may also transmit to the UE 3 the constraint information related to the CELL1. Processes in steps S604 and S605 are similar to those in the steps S403 and S404 shown in FIG. 8.

When the eNB 2 transmits the request in the step S601, the eNB 2 may also transmit constraint information that the eNB 2 recommends. In this case, the eNB 1 may send to the eNB 2 a result of the determination of whether the constraint information received from the eNB 2 has been approved or not. Alternatively, the eNB 1 may generate (or configure) constraint information that the eNB 1 recommends instead of the constraint information received from the eNB 2, and transmit the generated (or configured) constraint information to the eNB 2.

In a step S602, the eNB 1 may also transmit, to the eNB 2, constraint information related to the CELL1 for the UE 3. Similarly, in a step S603, the eNB 1 may transmit, to the UE 3, constraint information related to the CELL1.

Modification of Procedure Example 6

Figure 12:
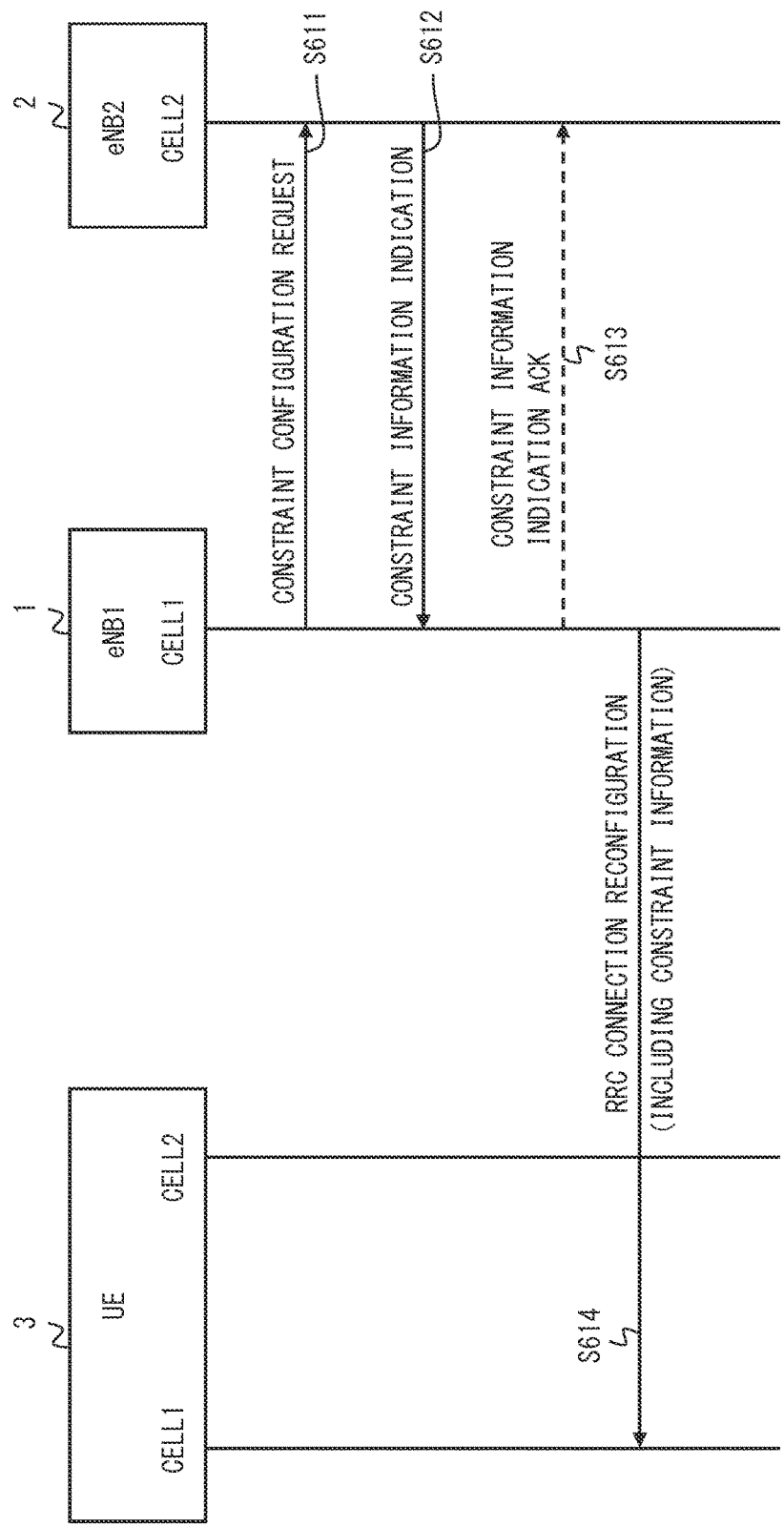
FIG. 12 is a sequence diagram showing another example of a communication control method in a radio communication system according to the second embodiment (Modification of Procedure Example 6)

The eNB 1 may request the eNB 2 to generate (or configure) constraint information related to the CELL2. In this case, the eNB 2 may transmit constraint information related to the CELL2 to the eNB 1 and the eNB 1 may transmit the received constraint information to the UE 3. FIG. 12 shows an example of a sequence diagram showing a modification of the Procedure Example 6. In FIG. 12, the first and second cells 10 and 20 are expressed as "CELL1" and "CELL2", respectively. In a step S611, the eNB 1 requests the eNB 2 to generate (or configure) constraint information related to the CELL2 (Constraint configuration request (for CELL2)). In a step S612, the eNB 2 transmits to the eNB 1 the constraint information related to the CELL2 (Constraint information indication). In a step S613, the eNB 1 may transmit to the eNB 2 a response indicting that the eNB 1 has received the constraint information related to the CELL2. In a step S614, the eNB 1 transmits to the UE 3 the constraint information related to the CELL2, which has been received from the eNB 2 (RRC Connection Reconfiguration (including Constraint information)).

PROCEDURE EXAMPLE 7

Figure 13A:
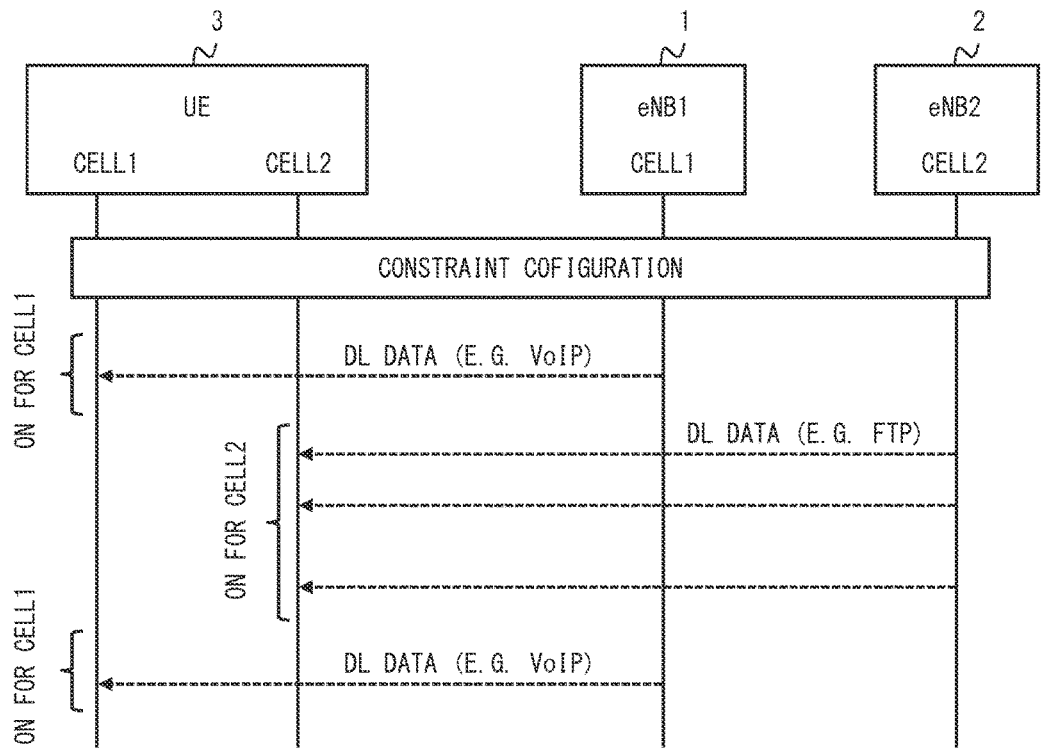
FIG. 13A is a sequence diagram showing another example of a communication control method in a radio communication system according to the second embodiment (Option 1 of Procedure Example 7)
Figure 13B:
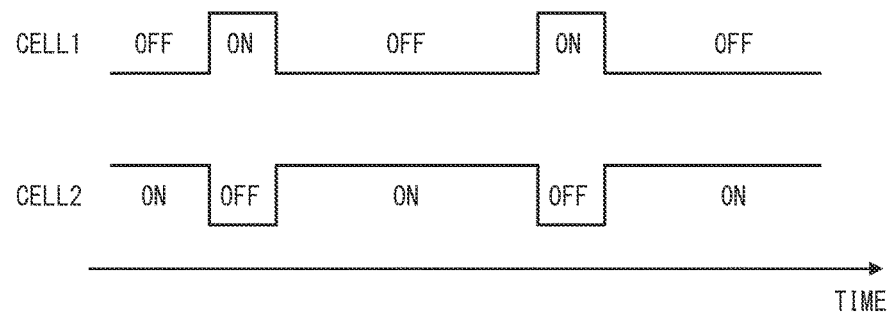
FIG. 13B is a sequence diagram showing a receiving period (ON-period) and a non-receiving period (OFF-period) in the option 1 of Procedure Example 7.

In this example, Options 1 to 3 of the setting of reception periods (ON-periods) and non-reception periods (OFF-periods) in the CELL1 and the CELL2 are explained. In the Option 1, the non-reception periods (OFF-periods) in the PCell and the SCell for the UE 3 are configured so that the reception periods (ON-periods) in the CELL1 do not overlap with the reception periods (ON-periods) in the CELL2 at all. Note that the non-reception periods (OFF-periods) in the PCell may partially overlap with the non-reception periods (OFF-periods) in the SCell. In other words, a non-reception period (OFF-period) in which the PDCCH does not need to be received in any of the CELL1 and the CELL2 may be configured. FIG. 13A is a sequence diagram showing a specific example of downlink data transmission in the Option 1. FIG. 13B shows an example of an arrangement of reception periods (ON-periods) and non-reception periods (OFF-periods) in the Option 1. As shown in FIGS. 13A and 13B, the reception periods (ON-periods) in the CELL1 and those in the CELL2 are alternately arranged along the time axis. According to the Option 1, the UE 3 does not need to simultaneously receive signals in the CELL1 and the CELL2, i.e., receives a signal in only one of them.

Figure 14A:
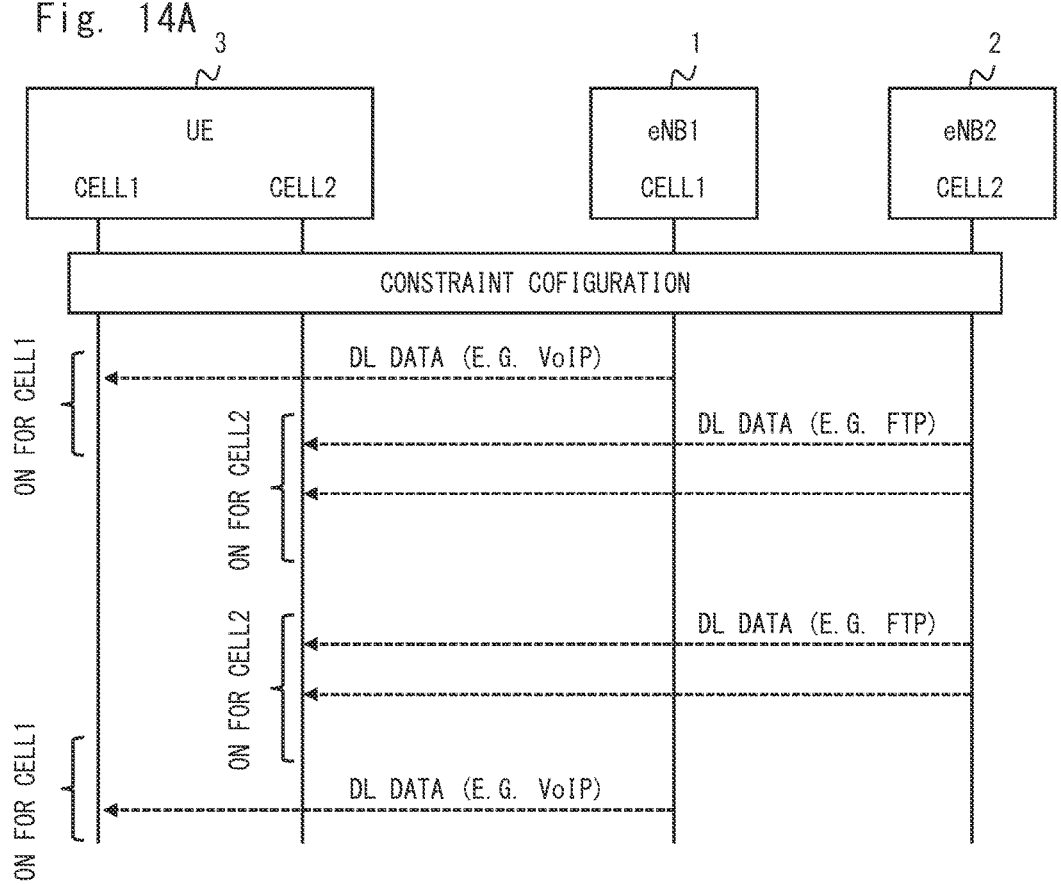
FIG. 14A is a sequence diagram showing another example of a communication control method in a radio communication system according to the second embodiment (Option 2 of Procedure Example 7)
Figure 14B:
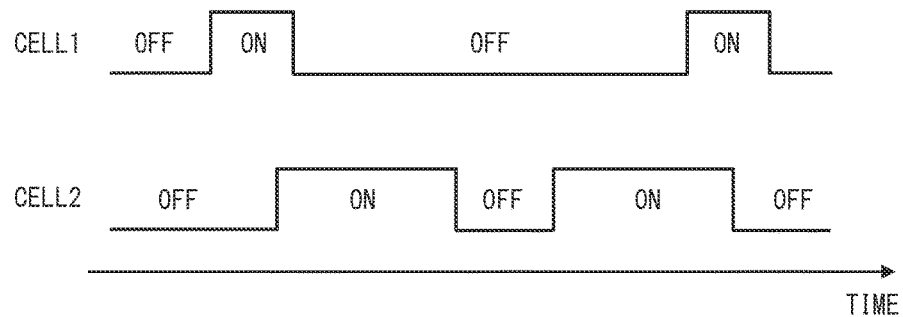
FIG. 14B shows a receiving period (ON-period) and a non-receiving period (OFF-period) in the option 2 of Procedure Example 7.

In the Option 2, the non-reception periods (OFF-periods) in the CELL1 for the UE 3 and those in the CELL2 are configured independently of each other. In other words, the reception periods (ON-periods) in the CELL1 for the UE 3 and those in the CELL2 are configured independently of each other. Note that in the Option 2, a non-reception period(s) (OFF-period(s)) may be configured for only one of the CELL1 and the CELL2. FIG. 14A is a sequence diagram showing a specific example of downlink data transmission in the Option 2. FIG. 14B shows an example of an arrangement of reception periods (ON-periods) and non-reception periods (OFF-periods) in the Option 2. Since reception periods (ON-periods) and non-reception periods (OFF-periods) in the CELL1 are independently configured from those in the CELL2, the reception periods (ON-periods) in the CELL1 and those in the CELL2 may partially overlap each other as shown in FIGS. 14A and 14B. Further, by chance, the reception periods (ON-periods) in the CELL1 and those in the CELL2 may not overlap at all. According to the Option 2, the reception periods (ON-periods) and the non-reception periods (OFF-periods) for the CELL1 and the CELL2 can be optimized according to their respective transmission patterns.

Figure 15A:
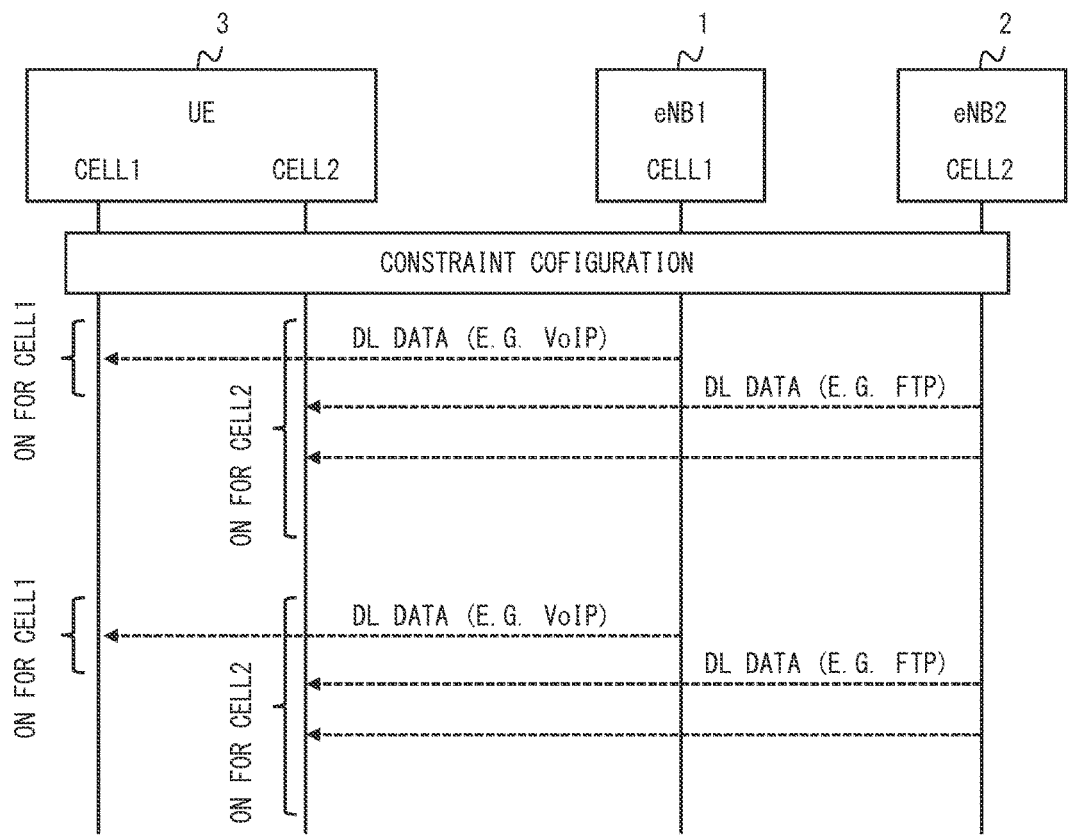
FIG. 15A is a sequence diagram showing another example of a communication control method in a radio communication system according to the second embodiment (Option 3 of Procedure Example 7)
Figure 15B:
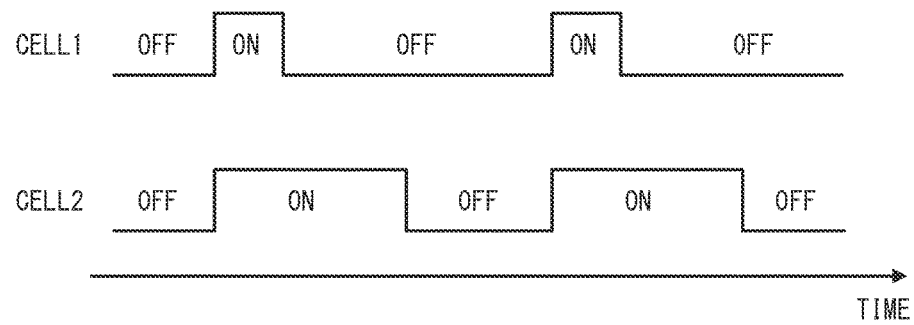
FIG. 15B shows a receiving period (ON-period) and a non-receiving period (OFF-period) in the option 3 of Procedure Example 7.

In the Option 3, the reception periods (ON-periods) in the PCell are configured so that they are included within the reception periods (ON-periods) in the SCell. FIG. 15A is a sequence diagram showing a specific example of downlink data transmission in the Option 3. FIG. 15B shows an example of an arrangement of reception periods (ON-periods) and non-reception periods (OFF-periods) in the Option 3. Note that in contrast to the example shown in FIGS. 15A and 15B, the reception periods (ON-periods) in the SCell may be determined so that they are included within the reception periods (ON-periods) in the PCell.

Note that in this embodiment, for example in the above-described Options 1 to 3, it is conceivable that each non-reception period (OFF-period) corresponds to a reception gap (Rx gap) in a serving cell. Alternatively, it is conceivable that each reception period (ON-period) and each non-reception period (OFF-period) correspond to an On-Duration (Wake up period) and an Opportunity for DRX (Sleep period), respectively, of a DRX cycle in a serving cell.

PROCEDURE EXAMPLE 8

In the above-described Procedure Examples 4 to 7, the setting of reception periods (ON-periods) and non-reception periods (OFF-periods) for the downlink transmission in inter-eNB carrier aggregation is explained. In the Procedure Example 8, an example where a transmission period and a non-transmission period are configured based on constraint information is explained. As described previously, the transmission period is an ON-period (or an Active period) in which the UE 3 may be permitted a transmission of an uplink signal (UL signal). In contrast to this, the non-transmission period is an OFF-period (or an Inactive period) in which the UE 3 is prohibited from transmitting an uplink signal (UL signal). Note that it is conceivable that the non-transmission period (OFF-period) in a serving cell corresponds to a transmission gap (Tx gap). Alternatively, it is conceivable that the transmission period (ON-period) in a serving cell corresponds to a transmission available period in transmission timing masking. Further, it is conceivable that the transmission period (ON-period) and the non-transmission period (OFF-period) in a serving cell correspond to an On-Duration (Transmission period) and an Opportunity for DTX (Non-transmission period), respectively, of a DTX cycle.

Figure 16:
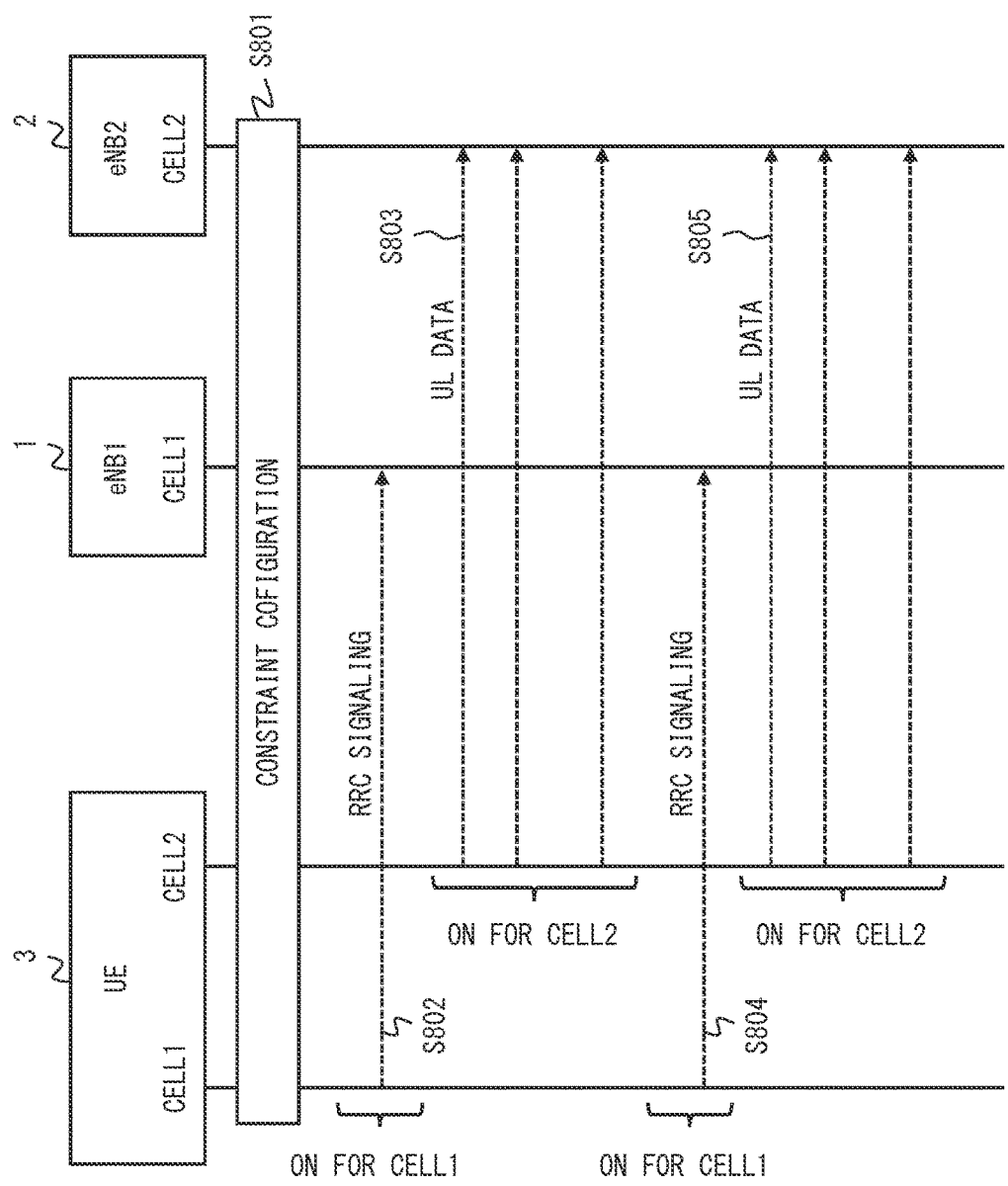
FIG. 16 is a sequence diagram showing another example of a communication control method in a radio communication system according to the second embodiment (Option 1 of Procedure Example 7)
Figure 17:
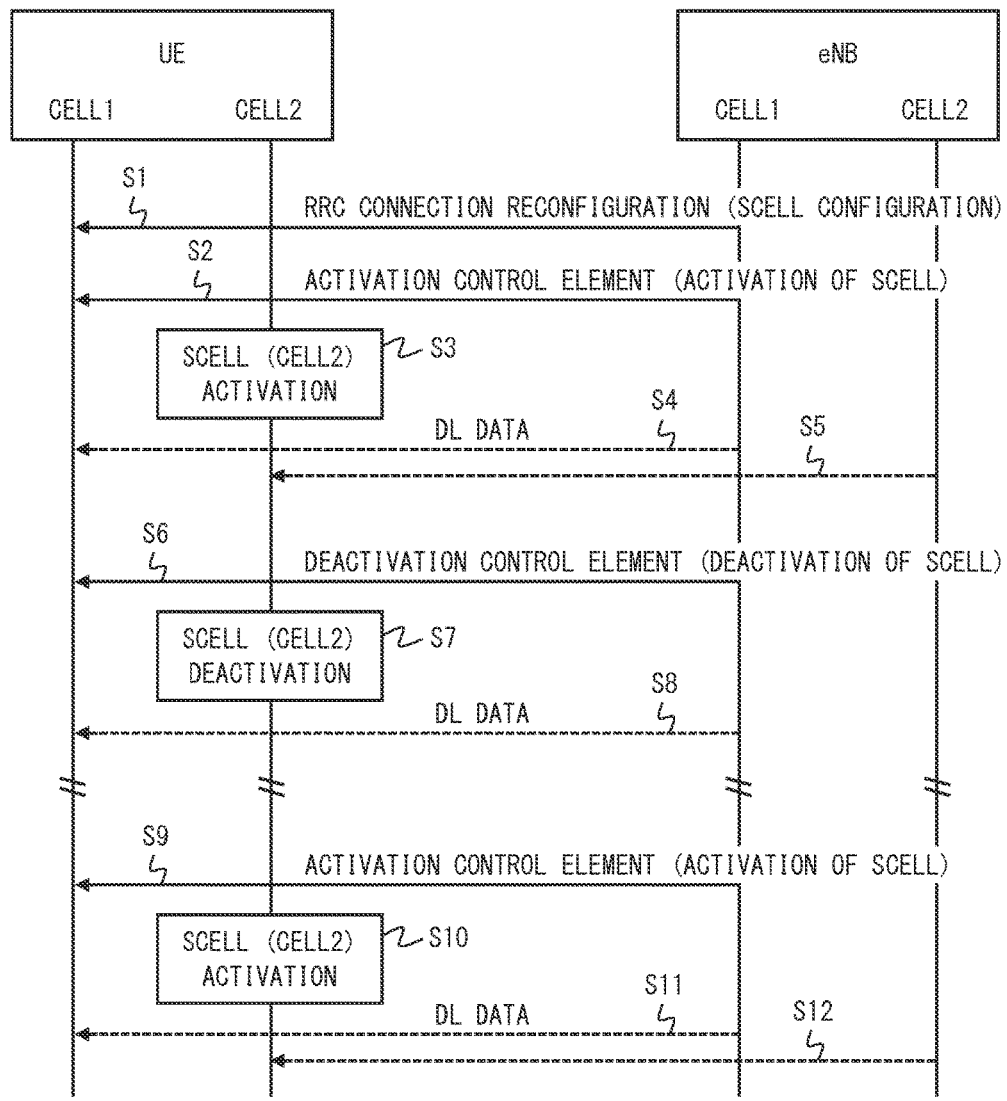
FIG. 17 is a sequence diagram showing a carrier aggregation procedure according to the LTE (Background Art).

FIG. 16 shows an example of a sequence diagram showing the Procedure Example 8. In FIG. 16, the first and second cells 10 and 20 are expressed as "CELL1" and "CELL2", respectively. In a step S801, the eNBs 1 and 2 and the UE 3 configure transmission periods (ON-periods) and non-transmission periods (OFF-periods) in the CELL1 and the CELL2 based on constraint information. The transmission periods (ON-periods) and the non-transmission periods (OFF-periods) may be configured in only one of the CELL1 and the CELL2. In the step S801, the UE 3 receives the constraint information from the eNB 1 or the eNB 2. The process in the step S801 may be similar to one of the constraint information transmission/reception procedures explained in the Procedure Examples 4 to 6.

In steps S802 to S405, the UE 3 transmits uplink signals in the CELL1 and the CELL2 based on the constraint information and the eNBs 1 and 2 receive the uplink signals transmitted from the UE. In the example shown in FIG. 16, RRC signaling is transmitted on the CELL1 and uplink data (user data) is transmitted on the CELL2. For example, the UE 3 transmits RRC signaling to the eNB 1 during a transmission period (ON-period) in the CELL1 (steps S802 and S804). Further, the UE 3 transmits uplink data to the eNB 2 during a transmission period (ON-period) in the CELL2 (steps S803 and S805).

In FIG. 18, transmission periods and non-transmission periods (OFF-periods) in the CELL1 and the CELL2 are configured in accordance with a concept similar to that of the Option 1 explained above in the Procedure Example 7. That is, the non-transmission periods (OFF-periods) in the PCell and the SCell for the UE 3 are configured so that the transmission periods (ON-periods) in the CELL1 do not overlap with the transmission periods (ON-periods) in the CELL2 at all. Note that the non-transmission periods (OFF-periods) in the PCell may partially overlap with the non-transmission periods (OFF-periods) in the SCell. In other words, a non-transmission period (OFF-period) in which uplink transmission is prohibited in both of the CELL1 and the CELL2 may be configured. In this way, the UE 3 does not need to simultaneously transmit uplink signals (RRC signaling and Data) in both the CELL1 and the CELL2, and it is thus possible to alleviate the complexity. In particular, when the CELL1 and the CELL2 use different frequency bands, it is conceivable that the uplink signal transmission timings suitable for maintaining the uplink synchronization are different from each other, thus requiring control in which this transmission timing difference is taken into account. However, by configuring transmission periods (ON-periods) as in the example shown in the steps S802 to S805 in FIG. 18, the complexity of this control is alleviated.

The above-described Procedure Examples 4 to 8 may be modified, for example, as shown below. In the Procedure Examples 4 to 8, it is shown that a reception gap (Rx gap) may be configured as an example of a non-reception period based on the constraint information, and a transmission gap (Tx gap) may be configured as an example of a non-transmission period based on the constraint information. In such cases, the below-listed exception handling processes may be applied.

The UE 3 receives important information such as system information (Master Information Block (MIB) or System Information Block (SIB)), paging (Paging indication or Paging channel (PCH)), and RRC signaling, irrespective of the reception gap.

The UE 3 receives a downlink re-transmitted signal, irrespective of the reception gap.

The UE 3 transmits an uplink re-transmitted signal, irrespective of the transmission gap.

The constraint information may be transmitted to the UE 3 through RRC signaling, and an instruction for activating or deactivating the constraint information (i.e., a reception constraint or a transmission constraint) may be transmitted through Medium Access Control (MAC) signaling or Layer 1 and/or Layer 2 (L1/L2) control signaling.

The transmission of constraint information may be performed by any one of the radio base stations (e.g., the eNB 1), and the activation and the deactivation of that constraint information (i.e., a reception constraint or a transmission constraint) may be performed in each of the radio base stations (the eNBs 1 and 2).

The transmission/reception of constraint information between the eNB 1 and the eNB 2 may be performed through a core network (e.g., an EPC).

Other Embodiments

In the first and second embodiments, examples where a reception constraint or a transmission constraint based on the constraint information is individually configured for each radio terminal (UE) are shown. However, a reception constraint or a transmission constraint based on the constraint information may be used in common for a plurality of radio terminals (UEs), or may be used in common for all the radio terminals (UEs) located in the same cell. Further, the constraint information may be individually transmitted to each radio terminal (UE). Alternatively, the constraint information may be transmitted to a plurality of radio terminals (UEs) by using a common massage, or may be transmitted to all the radio terminals (UEs) located in the same cell by using a common massage (e.g., by using system information).

The first and second embodiments can be applied to a case where the first radio station 1 (eNB 1) is a macro radio base station (Macro eNB (MeNB)) that serves (manages) a macro cell having a relatively large coverage and the second radio station 2 (eNB 2) is a low-power radio base station (Low Power Node (LPN)) that serves (manages) a cell having a small coverage. Examples of a LPN include a pico-radio base station (Pico eNB (PeNB)) having functions (protocol layers) similar to those of the MeNB and a new type of network node (New Node) having fewer functions (protocol layers) than those of the MeNB. Alternatively, it is conceivable to employ a configuration in which a MeNB manages a LPN and control functions (e.g., an RRC layer) in an LPN cell. Further, the second cell 20 may be a new type of cell (New Cell Type) which is different from conventional cells and uses a new type of carrier (New Carrier Type) different from conventional carriers.

Each of the communication control methods performed by the radio station 1 (communication control unit 15), the radio station 2 (communication control unit 25), and the radio terminal 3 (communication control unit 35) described in the first and second embodiments may be implemented by using a semiconductor processing device such as an Application Specific Integrated Circuit (ASIC). Alternatively, these methods may be implemented by causing a computer system including at least one processor (e.g., Microprocessor, Micro Processing Unit (MPU), or Digital Signal Processor (DSP)) to execute a program. Specifically, one or more programs including instructions for causing a computer system to perform algorithms shown in the flowcharts and the sequence diagrams may be created, and these programs may be supplied to a computer.

These programs can be stored in various types of non-transitory computer readable media and thereby supplied to computers. The non-transitory computer readable media includes various types of tangible storage media. Examples of the non-transitory computer readable media include a magnetic recording medium (such as a flexible disk, a magnetic tape, and a hard disk drive), a magneto-optic recording medium (such as a magneto-optic disk), a CD-ROM (Read Only Memory), a CD-R, and a CD-R/W, and a semiconductor memory (such as a mask ROM, a PROM (Programmable ROM), an EPROM (Erasable PROM), a flash ROM, and a RAM (Random Access Memory)). Further, these programs can be supplied to computers by using various types of transitory computer readable media. Examples of the transitory computer readable media include an electrical signal, an optical signal, and an electromagnetic wave. The transitory computer readable media can be used to supply programs to computer through a wire communication path such as an electrical wire and an optical fiber, or wireless communication path.

In the first and second embodiments, an LTE system has been mainly explained. However, these embodiments may be applied to radio communication systems other than the LTE system, such as a 3GPP Universal Mobile Telecommunications System (UMTS), a 3GPP2 CDMA2000 system (1xRTT, High Rate Packet Data (HRPD)), a Global System for Mobile Communications (GSM) system, and a WiMAX system.

Further, the above-described embodiments are merely examples for the application of the technical ideas obtained by the present inventors. Needless to say, these technical ideas are not limited to the above-described embodiments and various modifications can be made thereto.

This application is based upon and claims the benefit of priority from Japanese patent applications No. 2013-033703, filed on Feb. 22, 2013, the disclosure of which is incorporated herein in its entirety by reference.

REFERENCE SIGNS LIST

1 FIRST RADIO STATION
2 SECOND RADIO STATION
3 RADIO TERMINAL
10 FIRST CELL
20 SECOND CELL
15 COMMUNICATION CONTROL UNIT
25 COMMUNICATION CONTROL UNIT
35 COMMUNICATION CONTROL UNIT

The invention claimed is:

1. A radio communication system comprising:
a first radio station that serves a first cell;
a second radio station that serves a second cell; and
a radio terminal configured to perform Dual Connectivity using the first and second cells, wherein
the first radio station is configured to transmit first constraint information on the first cell and second constraint information on the second cell to the radio terminal,
the first constraint information contains a first information element for specifying a first transmission constraint related to the first cell when the Dual Connectivity is performed,
the second constraint information contains a second information element for specifying a second transmission constraint related to the second cell when the Dual Connectivity is performed,
each of the first and second transmission constraints includes a period related to uplink signal transmission by the radio terminal,
the first radio station is configured to transmit information for instructing the radio terminal to start the period in the first cell, and
the second radio station is configured to transmit information for instructing the radio terminal to start the period in the second cell.

2. The radio communication system according to claim 1, wherein each of the first and second transmission constraints includes a constraint indicating that the radio terminal is prohibited from transmitting an uplink signal.

3. The radio communication system according to claim 1, wherein the first information element explicitly or implicitly indicates a period in which the first transmission constraint is not imposed, and the second information element explicitly or implicitly indicates a period in which the second transmission constraint is not imposed.

4. The radio communication system according to claim 1, wherein the second information element explicitly or implicitly indicates, as an information element for specifying the second transmission constraint related to the second cell, at least one of a reception period, a non-reception period, a reception constraint, a transmission period, a non-transmission period, and a transmission constraint for the radio terminal in the first cell.

5. The radio communication system according to claim 1, wherein each of the first and second information elements explicitly or implicitly indicates at least one of:
(a) a period in which transmission of an uplink signal is prohibited;

(b) a period in which the uplink signal is transmitted; and
(c) a period in which transmission of the uplink signal is permitted.

6. The radio communication system according to claim 1, wherein the radio terminal is configured to perform a transmitting operation in accordance with at least one of the first and second transmission constraints when the radio terminal receives at least one of the information for instructing the radio terminal to start the period in the first cell and the information for instructing the radio terminal to start the period in the second cell.

7. The radio communication system according to claim 1, wherein the second radio station is further configured to transmit the second constraint information on the second cell to the first radio station.

8. The radio communication system according to claim 1, wherein
the first transmission constraint for the first cell and the second transmission constraint for the second cell are configured so that a start point of a transmission period in the second cell is independent of a start point of a transmission period in the first cell,
the transmission period in the second cell includes a period in which an uplink signal is transmitted in the second cell or a period in which transmission of the uplink signal in the second cell is permitted, and
the transmission period in the first cell includes a period in which an uplink signal is transmitted in the first cell or a period in which transmission of the uplink signal in the first cell is permitted.

9. A first radio station that serves a first cell, comprising:
a transceiver configured to communicate with a radio terminal; and
at least one processor configured to:
support Dual Connectivity using the first cell and a second cell served by a second radio station; and
transmit first constraint information on the first cell and second constraint information on the second cell to the radio terminal that performs the Dual Connectivity, wherein
the first constraint information contains a first information element for specifying a first transmission constraint related to the first cell when the Dual Connectivity is performed,
the second constraint information contains a second information element for specifying a second transmission constraint related to the second cell when the Dual Connectivity is performed,
each of the first and second transmission constraints includes a period related to uplink signal transmission by the radio terminal,
the transceiver is configured to transmit information for instructing the radio terminal to start the period in the first cell.

10. The first radio station according to claim 9, wherein each of the first and second transmission constraints includes a constraint indicating that the radio terminal is prohibited from transmitting an uplink signal.

11. The first radio station according to claim 9, wherein each of the first and second information elements explicitly or implicitly indicates at least one of:
(a) a period in which transmission of an uplink signal is prohibited;
(b) a period in which the uplink signal is transmitted; and
(c) a period in which transmission of the uplink signal is permitted.

12. The first radio station according to claim 9, wherein the at least one processor is configured to transmit, using the transceiver, the first constraint information and the second constraint information to the radio terminal, the second constraint information being sent from the second radio station.

13. A second radio station that serves a second cell, comprising:
a transceiver configured to communicate with a radio terminal; and
at least one processor configured to:
support Dual Connectivity using a first cell served by a first radio station and the second cell; and
transmit second constraint information on the second cell to the radio terminal via the first radio station, the radio terminal being configured to perform the Dual Connectivity, wherein
the second constraint information contains a second information element for specifying a second transmission constraint related to the second cell when the Dual Connectivity is performed, and is different from first constraint information on the first cell is transmitted from the first radio station to the radio terminal,
the first constraint information contains a first information element for specifying a first transmission constraint related to the first cell,
each of the first and second transmission constraints includes a period related to uplink signal transmission by the radio terminal, and
the transceiver is configured to transmit information for instructing the radio terminal to start the period in the second cell.

14. The second radio station according to claim 13, wherein the at least one processor is configured to transmit, using the transceiver, another second constraint information on the second cell directly to the radio terminal.

15. A radio terminal comprising:
at least one transceiver configured to communicate with a first radio station and a second radio station; and
at least one processor configured to:
support Dual Connectivity using a first cell served by the first radio station and a second cell served by the second radio station; and
receive, using the at least one transceiver, first constraint information on the first cell and second constraint information on the second cell from the first radio station, wherein
the first constraint information contains a first information element for specifying a first transmission constraint related to the first cell when the Dual Connectivity is performed,
the second constraint information contains a second information element for specifying a second transmission constraint related to the second cell when the Dual Connectivity is performed,
each of the first and second transmission constraints includes a period related to uplink signal transmission by the radio terminal, and
the at least one transceiver is configured to:
receive information for instructing the radio terminal to start the period in the first cell from the first radio station, and
receive information for instructing the radio terminal to start the period in the second cell from the second radio station.

16. The radio terminal according to claim 15, wherein each of the first and second transmission constraints includes a constraint indicating that the radio terminal is prohibited from transmitting an uplink signal.

17. The radio terminal according to claim 15, wherein each of the first and second information elements explicitly or implicitly indicates at least one of:
   (a) a period in which transmission of an uplink signal is prohibited;
   (b) a period in which the uplink signal is transmitted; and
   (c) a period in which transmission of the uplink signal is permitted.

18. The radio terminal according to claim 15, wherein the at least one processor is configured to perform a transmitting operation in accordance with at least one of the first and second transmission constraints when the radio terminal receives at least one of the information for instructing the radio terminal to start the period in the first cell and the information for instructing the radio terminal to start the period in the second cell.

19. A communication control method in a first radio station that serves a first cell, the communication control method comprising:
   transmitting first constraint information on the first cell and second constraint information on a second cell served by a second radio station to a radio terminal that performs Dual Connectivity using the first cell and the second cell, wherein
   the first constraint information contains a first information element for specifying a first transmission constraint related to the first cell when the Dual Connectivity is performed,
   the second constraint information contains a second information element for specifying a second transmission constraint related to the second cell when the Dual Connectivity is performed,
   each of the first and second transmission constraints includes a period related to uplink signal transmission by the radio terminal, and
   the communication control method further comprises transmitting information for instructing the radio terminal to start the period in the first cell.

20. The communication control method according to claim 19, wherein each of the first and second transmission constraints includes a constraint indicating that the radio terminal is prohibited from transmitting an uplink signal.

21. The communication control method according to claim 19, wherein each of the first and second information elements explicitly or implicitly indicates at least one of:
   (a) a period in which transmission of an uplink signal is prohibited;
   (b) a period in which the uplink signal is transmitted; and
   (c) a period in which transmission of the uplink signal is permitted.

22. A communication control method in a second radio station that serves a second cell, the communication control method comprising:
   transmitting second constraint information on the second cell to a radio terminal via a first radio station, the radio terminal being configured to perform Dual Connectivity using the second cell and a first cell served by the first radio station, wherein
   the second constraint information contains a second information element for specifying a second transmission constraint related to the second cell when the Dual Connectivity is performed, and is different from first constraint information on the first cell, transmitted from the first radio station to the radio terminal,
   the first constraint information contains a first information element for specifying a first transmission constraint related to the first cell,
   each of the first and second transmission constraints includes a period related to uplink signal transmission by the radio terminal, and
   the communication control method further comprises transmitting information for instructing the radio terminal to start the period in the second cell.

23. A communication control method in a radio terminal, the communication control method comprising:
   performing Dual Connectivity using a first cell served by a first radio station and a second cell served by a second radio station; and
   receiving first constraint information and second constraint information from the first radio station, wherein
   the first constraint information contains a first information element for specifying a first transmission constraint related to the first cell when the Dual Connectivity is performed,
   the second constraint information contains a second information element for specifying a second transmission constraint related to the second cell when the Dual Connectivity is performed,
   each of the first and second transmission constraints includes a period related to uplink signal transmission by the radio terminal, and
   the communication control method further comprises:
      receiving information for instructing the radio terminal to start the period in the first cell from the first radio station; and
      receiving information for instructing the radio terminal to start the period in the second cell from the second radio station.

24. The communication control method according to claim 23, wherein each of the first and second transmission constraints includes a constraint indicating that the radio terminal is prohibited from transmitting an uplink signal.

25. The communication control method according to claim 23, wherein each of the first and second information elements explicitly or implicitly indicates at least one of:
   (a) a period in which transmission of an uplink signal is prohibited;
   (b) a period in which the uplink signal is transmitted; and
   (c) a period in which transmission of the uplink signal is permitted.

26. The communication control method according to claim 23, wherein the performing Dual Connectivity includes performing a transmitting operation in accordance with at least one of the first and second transmission constraints when the radio terminal receives at least one of the information for instructing the radio terminal to start the period in the first cell and the information for instructing the radio terminal to start the period in the second cell.

27. A non-transitory computer readable medium storing a program for causing a computer to perform a communication control method in a first radio station that serves a first cell, wherein
   the communication control method comprises transmitting first constraint information on the first cell and second constraint information on a second cell served by a second radio station to a radio terminal that performs Dual Connectivity using the first cell and the second cell,
   the first constraint information contains a first information element for specifying a first transmission constraint related to the first cell when the Dual Connectivity is performed,
   the second constraint information contains a second information element for specifying a second transmission constraint related to the second cell when the Dual Connectivity is performed, each of the first and second transmission constraints includes a period related to uplink signal transmission by the radio terminal, and the communication control method further comprises transmitting information for instructing the radio terminal to start the period in the first cell.

28. A non-transitory computer readable medium storing a program for causing a computer to perform a communication control method in a second radio station that serves a second cell, wherein the communication control method comprises:
transmitting second constraint information on the second cell to a radio terminal via a first radio station, the radio terminal being configured to perform Dual Connectivity using the second cell and a first cell served by the first radio station, the second constraint information contains a second information element for specifying a second transmission constraint related to the second cell when the Dual Connectivity is performed, and is different from first constraint information on the first cell, transmitted from the first radio station to the radio terminal, the first constraint information contains a first information element for specifying a first transmission constraint related to the first cell each of the first and second transmission constraints includes a period related to uplink signal transmission by the radio terminal, and the communication control method further comprises transmitting information for instructing the radio terminal to start the period in the second cell.

29. A non-transitory computer readable medium storing a program for causing a computer to perform a communication control method in a radio terminal, wherein the communication control method comprises:
performing Dual Connectivity using a first cell served by a first radio station and a second cell served by a second radio station; and receiving first constraint information and second constraint information from the first radio station, the first constraint information contains a first information element for specifying a first transmission constraint related to the first cell when the Dual Connectivity is performed, the second constraint information contains a second information element for specifying a second transmission constraint related to the second cell when the Dual Connectivity is performed, each of the first and second transmission constraints includes a period related to uplink signal transmission by the radio terminal, and the communication control method further comprises:
receiving information for instructing the radio terminal to start the period in the first cell from the first radio station; and receiving information for instructing the radio terminal to start the period in the second cell from the second radio station.

30. The first radio station according to claim 9, wherein the transceiver is configured to transmit information for instructing the radio terminal to start the period in the second cell.

31. The second radio station according to claim 13, wherein the transceiver is configured to transmit information for instructing the radio terminal to start the period in the first cell.

32. The communication control method according to claim 19, wherein the communication control method further comprises transmitting information for instructing the radio terminal to start the period in the second cell.

33. The communication control method according to claim 19, wherein the second constraint information is sent from the second radio station to the first radio station.

* * * * *